(12) United States Patent
Hinds

(10) Patent No.: US 11,373,769 B2
(45) Date of Patent: Jun. 28, 2022

(54) PASSIVE CONTAINMENT COOLING SYSTEM FOR A NUCLEAR REACTOR

(71) Applicant: GE-Hitachi Nuclear Energy Americas LLC, Wilmington, NC (US)

(72) Inventor: David H. Hinds, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 195 days.

(21) Appl. No.: 16/726,355

(22) Filed: Dec. 24, 2019

(65) Prior Publication Data

US 2021/0193338 A1 Jun. 24, 2021

(51) Int. Cl.
| | | |
|---|---|---|
| *G21C 15/18* | (2006.01) | |
| *F16K 17/38* | (2006.01) | |
| *G21C 9/02* | (2006.01) | |
| *G21C 9/033* | (2006.01) | |
| *G21C 15/20* | (2006.01) | |

(52) U.S. Cl.
CPC ............ *G21C 15/18* (2013.01); *F16K 17/383* (2013.01); *G21C 9/022* (2013.01); *G21C 9/033* (2013.01); *G21C 9/024* (2013.01); *G21C 15/20* (2013.01)

(58) Field of Classification Search
CPC ........ G21C 9/004; G21C 9/008; G21C 9/022; G21C 15/02; G21C 15/26; G21C 15/18; F16K 17/383
USPC ................ 376/210, 211, 283, 284, 361, 403
See application file for complete search history.

(56) References Cited

U.S. PATENT DOCUMENTS

| | | | | |
|---|---|---|---|---|
| 4,645,641 A | * | 2/1987 | Nicolai | .................. G21C 9/008 376/283 |
| 5,080,857 A | | 1/1992 | Miller et al. | |
| 5,180,543 A | * | 1/1993 | Conway | ................. G21C 15/18 376/282 |
| 5,406,602 A | | 4/1995 | Hunsbedt et al. | |
| 2007/0076835 A1 | * | 4/2007 | Tobimatsu | ............. G21C 15/18 376/280 |
| 2010/0260302 A1 | | 10/2010 | Pelisson | |

(Continued)

OTHER PUBLICATIONS

International Search Report and Written Opinion thereof dated Jun. 7, 2021 for corresponding International Application No. PCT/US2020/066581.

*Primary Examiner* — Jack W Keith
*Assistant Examiner* — Jinney Kil
(74) *Attorney, Agent, or Firm* — Harness, Dickey & Pierce, P.L.C.

(57) ABSTRACT

A nuclear plant includes a nuclear reactor, a containment structure that at least partially defines a containment environment of the nuclear reactor, and a passive containment cooling system that causes coolant fluid to flow downwards from a coolant reservoir to a bottom of a coolant channel coupled to the containment structure and rise through the coolant channel toward the coolant reservoir due to absorbing heat from the nuclear reactor. A check valve assembly, in fluid communication with the coolant reservoir, selectively enables one-way flow of a containment fluid from the containment environment to the coolant reservoir, based on a pressure at an inlet being equal to or greater than a threshold magnitude. A fusible plug, in fluid communication with the coolant reservoir at a bottom vertical depth below the bottom of the coolant reservoir, enables coolant fluid to flow into the containment structure based on at least partially melting.

11 Claims, 7 Drawing Sheets

(56) References Cited

U.S. PATENT DOCUMENTS

| | | | |
|---|---|---|---|
| 2014/0301524 A1 | 10/2014 | Haratyk | |
| 2014/0321597 A1 | 10/2014 | Singh et al. | |
| 2015/0131769 A1* | 5/2015 | Larrion | B66B 11/0492 |
| | | | 376/282 |
| 2015/0194225 A1* | 7/2015 | Watson | G21C 9/004 |
| | | | 376/283 |

* cited by examiner

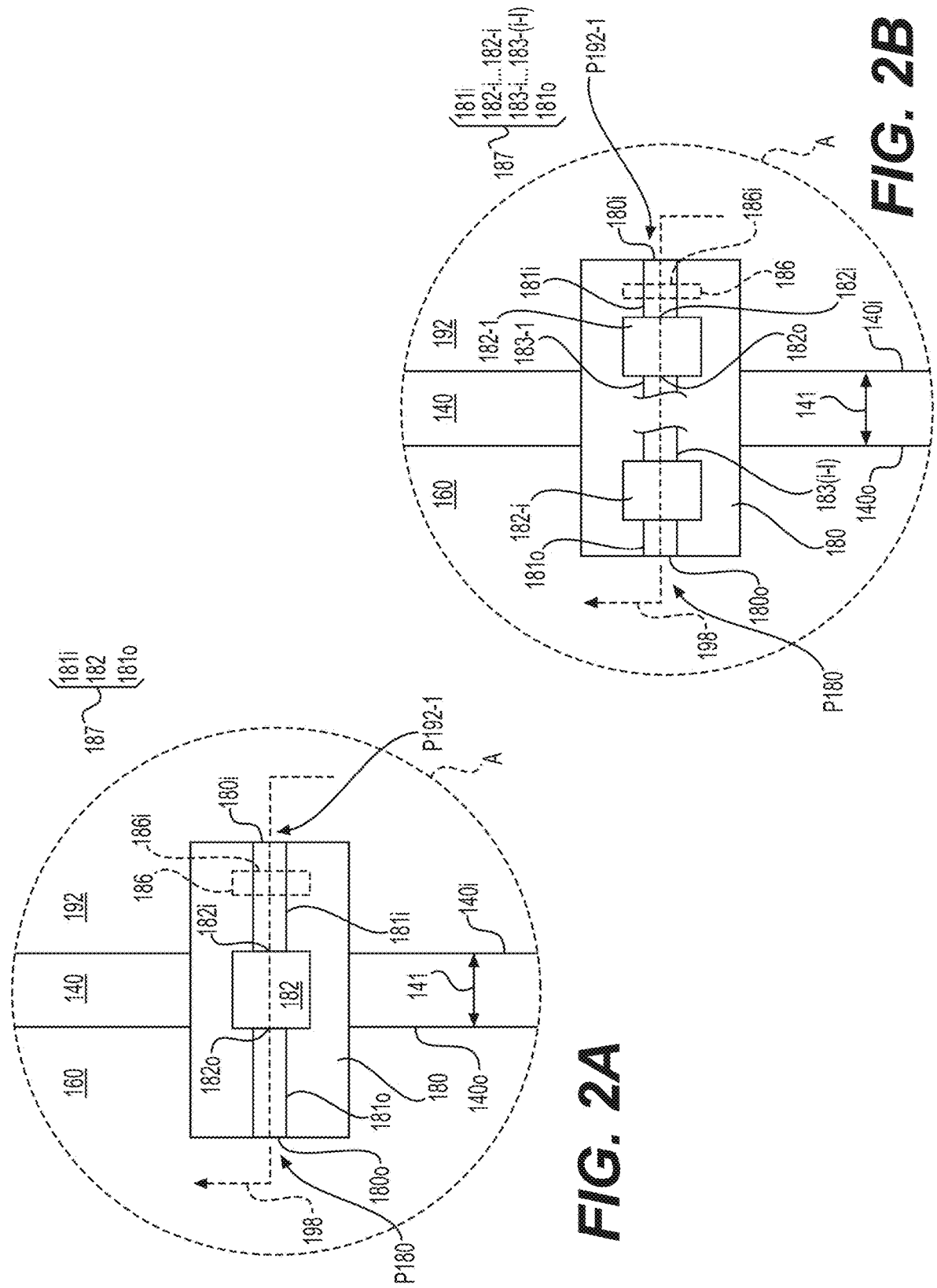

PASSIVE CONTAINMENT COOLING SYSTEM FOR A NUCLEAR REACTOR

BACKGROUND

Field

Example embodiments described herein relate in general to nuclear reactors and in particular to providing passive cooling of a nuclear reactor containment.

Description of Related Art

Nuclear reactors may be configured to be cooled via heat transfer to one or more coolant fluids circulated in or near the nuclear reactor. Such heat transfer may be referred to herein as heat rejection by the nuclear reactor. Various coolant fluids may be utilized to remove heat from the nuclear reactor. A coolant fluid may be a fluid that includes one or more various substances, including water, liquid metal, molten salt, a gaseous substance, some combination thereof, etc.

In some nuclear plants, a nuclear reactor includes a containment system, also referred to herein as simply "containment," for managing heat rejection by the nuclear reactor by facilitating circulation of a coolant fluid, such as water, to a point in the nuclear reactor where the coolant fluid absorbs heat rejected by the nuclear reactor, and the heated coolant fluid is then circulated to a heat return, or heat sink, where the heated coolant fluid may be cooled to release the absorbed heat. In some nuclear plants, the containment system may be impacted by heat rejection that exceeds the heat transfer capabilities of a power coolant loop that is used to induce work, for example to generate electricity. Accordingly, the containment system may utilize cooling to manage containment system temperature or prevent the containment system from exceeding its qualified temperature.

In some nuclear plants, a nuclear reactor may experience excursions of temperature and/or pressure within a containment environment in which the nuclear reactor may be located. The temperature and/or pressure within the containment environment may be controlled to influence performance and/or integrity of the nuclear reactor. In some nuclear plants, such temperature and/or pressure control may be implemented through various control systems that manage pressure release and/or cooling of the containment environment. Such control systems may utilize computer-implemented functionality and/or operator-controlled functionality, which may thus consume electrical power, operator operations, some combination thereof, or the like. In addition, pressure control within the containment environment may involve releasing fluids from the containment environment.

SUMMARY

According to some example embodiments, a nuclear plant may include a nuclear reactor, a containment structure having one or more inner surfaces at least partially defining a containment environment in which the nuclear reactor is located, and a passive containment cooling system. The passive containment cooling system may include a coolant reservoir configured to hold a coolant fluid, a coolant channel coupled to the containment structure such that the coolant channel extends vertically from a coolant channel inlet at a bottom of the coolant channel to a coolant channel outlet at a top of the coolant channel, and a coolant supply conduit extending downwards from an inlet of the coolant supply conduit that is open to a lower region of the coolant reservoir. An outlet of the coolant supply conduit may be coupled to the coolant channel inlet, such that the coolant supply conduit is configured to direct a flow of coolant fluid downwards out of the lower region of the coolant reservoir and into the bottom of the coolant channel via the coolant channel inlet according to gravity, such that the coolant fluid rises through the coolant channel from the bottom of the coolant channel to the top of the coolant channel according to a change in coolant fluid buoyancy based on the coolant fluid absorbing heat rejected from the nuclear reactor in the containment environment. The passive containment cooling system may include a coolant return conduit having an inlet coupled to the coolant channel outlet at the top of the coolant channel. The coolant return conduit may extend upwards from the inlet of the coolant return conduit to an outlet of the coolant return conduit that is open to an upper region of the coolant reservoir that is above the lower region of the coolant reservoir, such that the coolant return conduit is configured to direct a flow of the coolant fluid to rise out of the top of the coolant channel via the coolant channel outlet and into the upper region of the coolant reservoir according to increased buoyancy of the coolant fluid at the top of the coolant channel over the buoyancy of the coolant fluid at the bottom of the coolant channel.

The passive containment cooling system may include a first check valve assembly at a first vertical depth below a top surface of coolant fluid in the coolant reservoir, the first check valve assembly in fluid communication with the coolant reservoir and with the containment environment. The first check valve assembly may include one or more check valves coupled between a first check valve assembly inlet and a first check valve assembly outlet. The first check valve assembly inlet may be in fluid communication with the coolant reservoir. The one or more check valves may be configured to open in response to a pressure at an inlet of the one or more check valves being equal to or greater than a first threshold magnitude, the first threshold magnitude at least partially corresponding to a hydrostatic pressure of the coolant fluid at the check valve assembly outlet at the first vertical depth. The first check valve assembly may be configured to selectively enable one-way flow of a containment fluid, from the containment environment via the first check valve assembly inlet to the coolant reservoir via the first check valve assembly outlet, based on the one or more check valves opening in response to a pressure of the containment environment at the first check valve assembly inlet at the first vertical depth being equal to or greater than the first threshold magnitude.

The first check valve assembly may extend through the containment structure and into the coolant channel at the first vertical depth, and the first check valve assembly may be open to the coolant channel, such that the first check valve assembly is in fluid communication with the coolant reservoir through the coolant channel. The first check valve assembly may be configured to selectively enable the one-way flow of the containment fluid, from the containment environment via the first check valve assembly inlet, to the coolant channel via the first check valve assembly outlet.

The first threshold magnitude may be greater than a reference hydrostatic pressure of the coolant fluid in the coolant channel at the first vertical depth below the bottom of the coolant reservoir that results from the coolant reservoir being filled to a reference reservoir depth, such that the reference hydrostatic pressure of the coolant fluid in the coolant channel at the first vertical depth is equal to a hydrostatic pressure of the coolant fluid at a particular vertical depth that is a sum of the first vertical depth and the reference reservoir depth.

The first check valve assembly may be configured to, subsequently to selectively enabling the one-way flow, inhibit the one-way flow of the containment fluid based on the one or more check valves closing in response to the pressure of the containment environment at the first check valve assembly inlet being less than the first threshold magnitude.

The one or more check valves may include a series connection of a plurality of check valves between the first check valve assembly inlet and the first check valve assembly outlet. Each check valve of the plurality of check valves may be configured to open in response to a pressure at an inlet of the check valve being equal to or greater than the first threshold magnitude. The first check valve assembly may be configured to selectively enable the one-way flow based on all check valves of the series connection of the plurality of check valves opening.

The one or more check valves may include a parallel connection of a plurality of sets of one or more check valves between the first check valve assembly inlet and one or more check valve assembly outlets. Each check valve of the plurality of sets of one or more check valves may be configured to open in response to a pressure at an inlet of the check valve being equal to or greater than the first threshold magnitude. The first check valve assembly may be configured to selectively enable the one-way flow based on any set of one or more check valves of the parallel connection of the plurality of sets of one or more check valves.

The first check valve assembly may include a burst disc coupled in series with the one or more check valves. The burst disc may be configured to rupture in response to a pressure increase in the containment environment to a particular (or, alternatively, pre-determined) threshold (e.g., "set point") pressure magnitude, thereby allowing the containment fluid pressure to reach the inlet of the first check valve assembly which allows containment fluid flow when the pressure at the inlet is equal to or greater than the first threshold magnitude.

The nuclear plant may further include a second check valve assembly at a second vertical depth below the top surface of coolant fluid in the coolant reservoir. The second check valve assembly may be in fluid communication with the coolant reservoir and with the containment environment. The second vertical depth may be less than the first vertical depth. The second check valve assembly may be configured to selectively enable one-way flow of the containment fluid, from the containment environment to the coolant reservoir, based on one or more check valves of the second check valve assembly opening in response to a pressure of the containment environment at an inlet of the second check valve assembly being equal to or greater than a second threshold magnitude. The second threshold magnitude may at least partially correspond to a hydrostatic pressure of the coolant fluid at an outlet of the second check valve assembly at the second vertical depth.

The nuclear plant may further include a fusible plug in fluid communication with the coolant reservoir and with the containment environment at a bottom vertical depth below the top surface of the coolant fluid in the coolant reservoir. The bottom vertical depth may be greater than the first vertical depth, such that a hydrostatic pressure of the coolant fluid at the bottom vertical depth is greater than the hydrostatic pressure of the coolant fluid at the first check valve assembly outlet at the first vertical depth. The fusible plug may be configured to at least partially melt in response to a temperature in the containment environment at an end of the fusible plug that is open to the containment environment being equal to or greater than a threshold temperature, such that the fusible plug exposes a flow conduit extending between the coolant reservoir into the containment environment to at least partially flood the containment environment with at least some of the coolant fluid.

The first check valve assembly may be configured to, based on selectively enabling the one-way flow of the containment fluid in response to the pressure in the containment environment at the first check valve assembly inlet being equal to or greater than the first threshold magnitude, maintain a pressure in the containment environment at the bottom vertical depth at a magnitude that is less than the hydrostatic pressure of the coolant fluid at the bottom vertical depth, to enable flow of coolant fluid through the exposed flow conduit and into the containment environment in response to the fusible plug at least partially melting.

The first check valve assembly and the fusible plug may be collectively configured to enable circulation of coolant fluid within the containment environment, from the coolant channel or other coolant routing pathway at the bottom vertical depth to the containment environment via the fusible plug and from the containment environment at the first vertical depth to the coolant channel or other coolant routing pathway via the first check valve assembly.

According to some example embodiments, a method for operating a passive containment cooling system for a nuclear reactor may include directing a flow of coolant fluid downwards out of a lower region of a coolant reservoir via a coolant supply conduit according to gravity to a bottom of a coolant channel that extends vertically along a containment structure that at least partially defines a containment environment in which the nuclear reactor is located, and causing the coolant fluid to rise through the coolant channel from the bottom of the coolant channel toward an upper region of the coolant reservoir via a top of the coolant channel according to a change in coolant fluid buoyancy based on the coolant fluid absorbing heat rejected from the nuclear reactor in the containment environment via at least the containment structure.

The method may include selectively enabling a one-way flow of a containment fluid, from the containment environment to the coolant reservoir via a first check valve assembly at a first vertical depth below a top surface of coolant fluid in the coolant reservoir, the first check valve assembly in fluid communication with the coolant reservoir and with the containment. The selectively enabling may be based on one or more check valves of the first check valve assembly opening in response to a pressure at an inlet of the one or more check valves being equal to or greater than a first threshold magnitude. The first threshold magnitude may at least partially correspond to a hydrostatic pressure of the coolant fluid at an outlet of the first check valve assembly at the first vertical depth.

The first threshold magnitude may be greater than a reference hydrostatic pressure of the coolant fluid in the coolant channel at the first vertical depth below the top surface of the coolant fluid in the coolant reservoir that results from the coolant reservoir being filled to a reference reservoir depth, such that the reference hydrostatic pressure of the coolant fluid in the coolant channel at the first vertical depth is equal to a hydrostatic pressure of the coolant fluid at a particular vertical depth that is a sum of the first vertical depth and the reference reservoir depth.

The method may further include inhibiting the one-way flow, subsequently to selectively enabling the one-way flow, based on the one or more check valves closing in response to the pressure of the containment environment at an inlet of the first check valve assembly being less than the first threshold magnitude.

The one or more check valves may include a series connection of a plurality of check valves between an inlet of the first check valve assembly and the outlet of the first check valve assembly. Each check valve of the plurality of check valves may be configured to open in response to a pressure at an inlet of the check valve being equal to or greater than the first threshold magnitude. The selectively enabling may be based on all check valves of the series connection of the plurality of check valves opening.

The one or more check valves may include a parallel connection of a plurality of sets of one or more check valves between an inlet of the first check valve assembly and one or more check valve assembly outlets. Each check valve of the plurality of sets of one or more check valves may be configured to open in response to a pressure at an inlet of the check valve being equal to or greater than the first threshold magnitude. The selectively enabling may be based on any set of one or more check valves of the parallel connection of the plurality of sets of one or more check valves.

The selectively enabling may be based on a burst disc coupled in series with the one or more check valves, for example, between the inlet of the one or more check valves and an inlet of the first check valve assembly, rupturing in response to a pressure at the inlet of the first check valve assembly at the first vertical depth being equal to or greater than the first threshold magnitude.

The method may further include directing at least a portion of the coolant fluid at a bottom vertical depth below the top surface of the coolant fluid in the coolant reservoir to flow into the containment environment via an exposed flow conduit between the coolant reservoir and the containment environment at the bottom vertical depth to at least partially flood the containment environment, based on a fusible plug in fluid communication with the coolant reservoir and with the containment environment, at the bottom vertical depth, at least partially melting to expose the flow conduit in response to a temperature in the containment environment at an end of the fusible plug that is open to the containment environment being equal to or greater than a threshold temperature.

The first check valve assembly, based on selectively enabling the one-way flow, may maintain a pressure in the containment environment at the bottom vertical depth at a magnitude that is less than the hydrostatic pressure of the coolant fluid at the bottom vertical depth, to enable flow of coolant fluid through the exposed flow conduit and into the containment environment in response to the fusible plug at least partially melting.

The first check valve assembly and the fusible plug may collectively enable circulation of coolant fluid within the containment environment, from the coolant channel or other coolant routing pathway at the bottom vertical depth to the containment environment via the fusible plug and from the containment environment at the first vertical depth to the coolant channel or other coolant routing pathway via the first check valve assembly.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIGS. 2A-2C are expanded views of region A of FIG. 1, according to some example embodiments.

DETAILED DESCRIPTION

Figure 1:
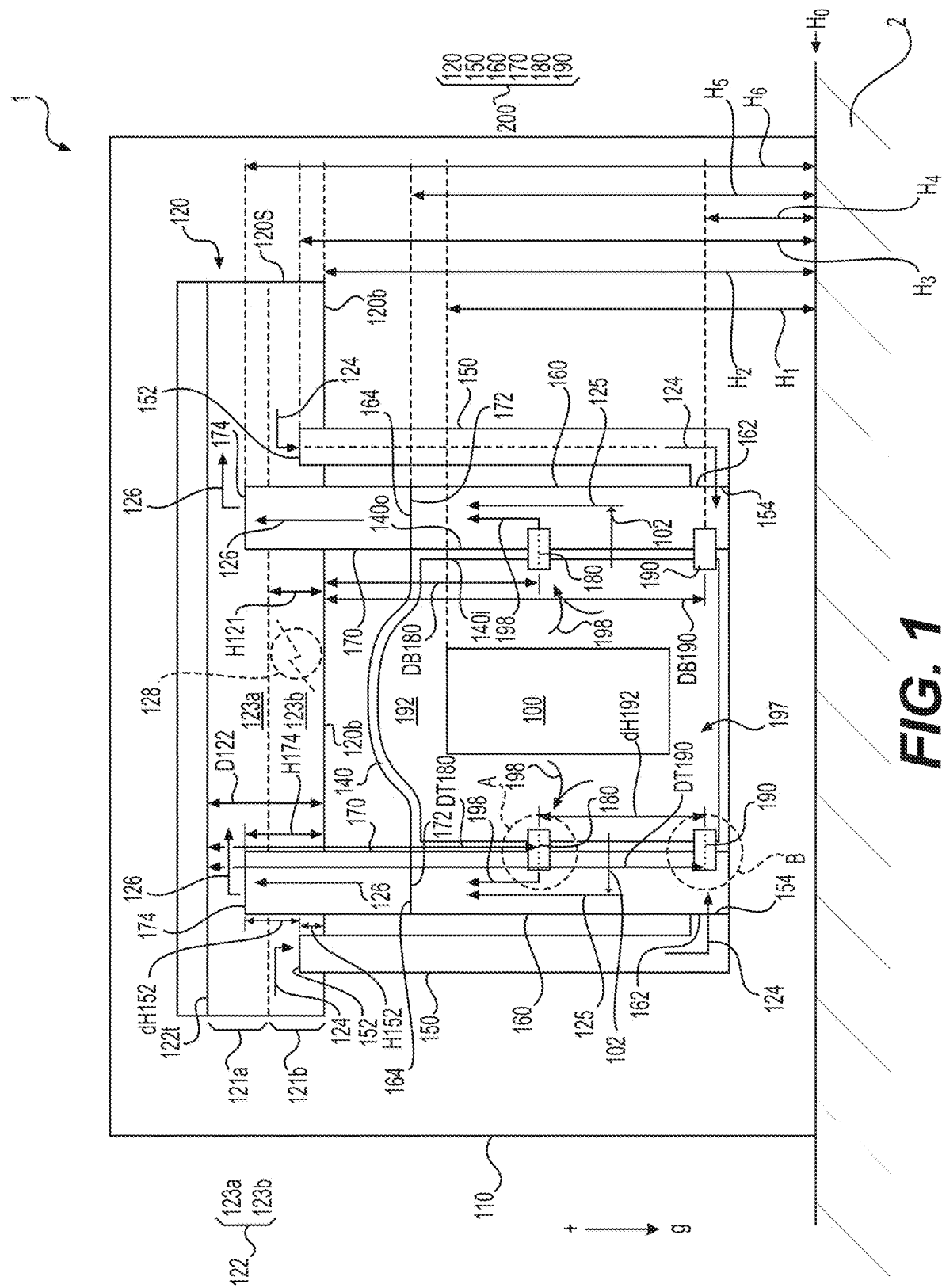
FIG. 1 is a cross-sectional schematic side view of a nuclear plant that includes a passive containment cooling system that further includes a containment venting system and a containment flooding system, according to some example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

It will be understood that a "nuclear reactor" as described herein may include any or all of the well-known components of a nuclear reactor, including a nuclear reactor core with or without nuclear fuel components, control rods, or the like. It will be understood that a nuclear reactor as described herein may include any type of nuclear reactor, including but not limited to a Boiling Water Reactor (BWR), a Pressurized Water Reactor (PWR), a liquid metal cooled reactor, a Molten Salt Reactor (MSR), or the like. As described herein, a nuclear reactor may include an Advanced Boiling Water Reactor (ABWR), an Economic Simplified Boiling Water Reactor (ESBWR), a BWRX-300 reactor, or the like.

It will be understood that a "coolant fluid" as described herein may include any well-known coolant fluid that may be used in cooling any part of a nuclear plant and/or nuclear reactor, including water, a liquid metal (e.g., liquid sodium), a gas (e.g., helium), a molten salt, any combination thereof, or the like. It will be understood that a "fluid" as described herein may include a gas, a liquid, or any combination thereof.

The present disclosure relates to a unique passive containment cooling system that utilizes one or more coolant channels coupled to a containment structure and extending vertically, from a coolant channel inlet at a bottom of the coolant channel to a coolant channel outlet at a top of the coolant channel, where the passive containment cooling system, also referred to herein as simply a "passive containment cooling system," directs a coolant fluid to flow into the bottom of the coolant channel via the coolant channel inlet such that the coolant fluid rises vertically through the coolant channel, from the bottom of the coolant channel to a top of the coolant channel, according to a change in coolant fluid buoyancy based on the coolant fluid absorbing heat rejected from the nuclear reactor in the containment environment, where the coolant channel is coupled to the containment structure. The passive containment cooling system may supply the coolant fluid to the bottom of the coolant channel via the inlet thereof based on being directed to flow downwards (e.g., in the direction of gravitational acceleration) according to gravity from a coolant reservoir, via a coolant supply conduit extending downwards from an inlet of the coolant supply conduit that is open to a lower region of the coolant reservoir to an outlet of the coolant supply conduit that is coupled to the coolant channel inlet. Additionally, the passive containment cooling system may return the coolant fluid to an upper region of the coolant reservoir due to the increased buoyancy of the heated coolant fluid via a coolant return conduit having an inlet coupled to the coolant channel outlet at the top of the coolant channel and extending upwards from the inlet of the coolant return conduit to an outlet of the coolant return conduit that is open to the upper region of the coolant reservoir that is above the lower region of the coolant reservoir to which the inlet of the coolant supply conduit is open.

As a result, the passive containment cooling system may drive circulation of coolant fluid upwards and out of the coolant channel and back into the coolant reservoir due to increased buoyancy due to absorbing heat rejected from the nuclear reactor, and the rising coolant fluid may be displaced in the bottom of the coolant channel by colder coolant fluid that flows downwards to the bottom of the coolant channel via a separate coolant supply conduit according to gravity, thereby enabling removal of heat from the containment environment. Because the colder coolant fluid is directed from a lower region of the coolant reservoir and the heated coolant fluid is directed into a higher, upper region of the coolant reservoir, the heated coolant fluid may remain above the colder coolant fluid in the coolant reservoir due to having increased buoyancy as a result of being heated by heat rejected from the nuclear reactor and thus being warmer than the cold coolant fluid, such that the coolant fluid that is directed to fall through the coolant supply conduit to the bottom of the coolant channel may be colder than the heated coolant fluid that is returned to the coolant reservoir via the coolant return conduit. Thus, it will be understood that the heated coolant fluid may be returned to the coolant reservoir via a coolant return conduit outlet that is open to the coolant reservoir at a greater height from a bottom of the coolant reservoir than the coolant supply conduit inlet. Accordingly, the circulation of coolant through the passive containment cooling system to remove heat rejected by the nuclear reactor to the coolant reservoir, where the coolant reservoir may function as an at least temporary heat sink, may be "passive" in that the circulation is not driven due to operation of a flow generator device, e.g., a pump, or based on intervention of an operator (e.g., including a human and/or processing circuitry, such as a processor executing a program of instructions stored on a memory, that generates an electrical control signal to control one or more devices), to induce or maintain a flow of coolant fluid. Accordingly, based on providing "passive" cooling of the nuclear reactor, the passive containment cooling system may enable improved operational efficiency of the nuclear plant based on reducing energy consumption to operate the nuclear plant and improved safety by not relying upon operator or control system intervention to control one or more devices to enable and/or control the cooling of the nuclear reactor.

The coolant channel may be any type of conduit, including a pipe that is coupled (e.g., welded, bolted, secured through mechanical means, etc.) to a surface of a containment structure (e.g., an outer surface, an inner surface, an interior surface, any combination thereof, or the like), a channel defined within an interior of a structure that partially or entirely defines the containment structure (e.g., an integrated passive cooling containment structure), any combination thereof, or the like.

The passive containment cooling system further may include one or more first check valve assemblies that enable passive control (e.g., control that is not controlled due to operator or control system intervention) of the pressure within the containment environment in which the nuclear reactor is located. The one or more first check valve assemblies are in fluid communication with both the containment environment and the coolant reservoir and may selectively enable one-way flow (also referred to herein as performing "venting") of containment fluid out of the containment environment and to the coolant reservoir, via one or more channels and/or conduits to which the one or more first check valve assemblies are open and via which the one or more first check valve assemblies are in fluid communication with the coolant reservoir, based on whether the pressure in the containment environment at the inlets of the one or more first check valve assemblies reaches (e.g., is equal to or greater than) a threshold pressure magnitude that corresponds to a hydrostatic pressure of the coolant fluid the coolant reservoir at the outlets of the one or more first check valve assemblies, such that a pressure gradient from the containment environment to the one or more coolant channels or other pathway to the coolant reservoir through the one or more first check valve assemblies is ensured, thereby reducing or preventing the risk of backflow through the one or more first check valve assemblies from the one or more coolant channels or other pathway to the coolant reservoir into the containment environment.

As a result, the one or more first check valve assemblies may selectively, based on actuation of one or more check valves included therein between a closed state and an open state, enable one-way flow of a containment fluid from the containment environment to the coolant reservoir to relieve the pressure in the containment environment. Such enabling of one-way flow of containment fluid to the coolant reservoir may be referred to as "venting" of the containment environment. The containment fluid may include one or more of a gas, liquid, solid material entrained in a gas and/or liquid, any combination thereof, or the like.

In some example embodiments, the first check valve assembly may extend through the containment structure and into a coolant channel at a depth below the reservoir, such that the first check valve assembly is open to the coolant channel, is in fluid communication with the coolant reservoir through the coolant channel, and is configured to selectively enable the one-way flow from the containment environment to the coolant channel at the depth, but example embodiments are not limited thereto.

The containment fluid may include radioactive material, and the one or more first check valve assemblies may, based on the selectively enabling of one-way flow out of the containment environment, selectively "vent" the containment fluid into the coolant reservoir and/or the flow of coolant fluid in one or more coolant channels or other pathway to the coolant reservoir, such that the containment fluid may be entrained in the upwards flow of the coolant fluid to the top of the one or more coolant channels or other pathway to the coolant reservoir and thus the containment fluid may be drawn into the coolant reservoir via the flow of the coolant fluid. As a result of being drawn into, and thus retained in, the coolant reservoir based on being vented into the coolant fluid in the one or more coolant channels or other pathway to the coolant reservoir, the containment fluid may be restricted, at least temporarily, from being released to an exterior of the nuclear plant. The coolant reservoir, in addition to functioning as a heat sink for heat removed from the containment environment via the coolant fluid, may function as a reservoir for radioactive materials included in the containment fluid. Additionally, containment fluid that includes a gas, such as water vapor (e.g., steam) may be condensed back into a liquid state by the coolant fluid in the coolant channel and/or reservoir, thereby mitigating pressure buildup in the nuclear plant containment and reducing or preventing the need to vent gases to an atmosphere external to the nuclear plant.

The one or more check valve assemblies may include one or more check valves that are configured to actuate, between open and closed states, based on whether a pressure at an inlet of the one or more check valves reaches a threshold pressure. The one or more check valves may be configured to actuate open or closed (e.g., actuate to the open state or closed state) based on the pressure at the inlet and thus without any intervention by an operator (e.g., a human and/or processing circuitry) or control system to control the venting operation. Accordingly, the venting functionality provided by a check valve assembly may be understood to be "passive" at least by virtue of not operating based on operator or control system intervention. As a result, containment may be improved while also providing pressure release capability for the nuclear plant containment. It will be understood that the nuclear plant "containment" may encompass a structure that encompasses at least the containment environment, in which the nuclear reactor of the nuclear plant is located. It will be understood that "control system" intervention may refer to intervention by a control system that may include one or more instances of processing circuitry, for example a processor executing a program of instructions stored on a memory, where the intervention performed by the control system may include, without limitation, the control system generating an electrical signal, also referred to a control signal, that is communicated (e.g., transmitted) to a device to cause the device or another, separate device to perform an operation (e.g., actuate a valve, control a pump operation, etc.).

The passive containment cooling system may further include one or more fusible plugs in fluid communication with the coolant reservoir and with the containment environment (e.g., based on the fusible plug(s) extending through the containment structure that at least partially defines the containment environment and into the coolant channel or other pathway) to the coolant reservoir at a depth that is below a lowest depth below the coolant reservoir at which the one or more check valve assemblies are located, such that a hydrostatic pressure of the coolant fluid in the coolant channel or other pathway to the coolant reservoir at the depth of the fusible plug in the coolant channel or other pathway to the coolant reservoir is greater than the greatest hydrostatic pressure of the coolant fluid in the coolant channel or other pathway to the coolant reservoir at the one or more check valve assembly outlet. The one or more fusible plugs, which may be any well-known fusible plug, may be configured (e.g., based on including a particular fusible alloy) to at least partially melt in response to a temperature in the containment environment at a portion of the fusible plug that is open to the containment environment at least meeting a threshold temperature (e.g., a melting temperature of the particular fusible alloy), such that the fusible plug at least partially melts to expose a flow conduit extending between the coolant reservoir and the containment environment via the fusible plug. As a result, at least some of the coolant fluid in the coolant channel or other pathway to the coolant reservoir may at least partially flood the containment environment, thereby providing temperature control in the containment environment and aid in limiting nuclear reactor temperature. Additionally, the one or more first check valve assemblies may be configured to selectively actuate to ensure that the pressure in the containment environment at the fusible plug is less than the hydrostatic pressure of coolant fluid in the coolant channel or other pathway to the coolant reservoir at the depth of the fusible plug, thereby ensuring a pressure gradient from the coolant channel or other pathway to the coolant reservoir into the containment environment when the temperature in the containment environment at the fusible plug reaches the threshold temperature, thereby reducing or preventing the risk that coolant fluid may not flow into the containment environment when the fusible plug at least partially melts. The flooding of the containment environment may provide cooling of the nuclear reactor and/or the containment environment and/or cooling of materials in the containment environment, including radioactive materials including, but not limited to fuel containing material (FCM), lava-like fuel containing material (LFCM), "corium" as the term is well-known to be understood in the nuclear power industry with regard to nuclear reactors, any combination thereof, or the like.

The passive containment cooling system may be configured, based on the one or more first check valve assemblies being configured to actuate (and selectively enable the one-way flow out of the containment environment) at a particular threshold pressure magnitude and the fusible plug being configured to at least partially melt at a particular threshold temperature, to ensure that the fusible plug melts after the one or more first check valve assemblies have enabled the one-way flow, thereby enabling a flow path of fluid (e.g., coolant fluid) into the containment environment from the coolant channel or other pathway to the coolant reservoir via the flow conduit exposed by the at least partially melted fusible plug, upwards through the containment environment to the one or more first check valve assemblies, and back into the coolant channel from the containment environment via the one or more first check valve assemblies, Based on providing a capability to at least partially flood the containment environment via at least partially melted fusible plugs, such flooding capability may be considered to be "passive" in that the capability may be implemented without (e.g., independently of) operator or control system intervention. Accordingly, cooling performance of the nuclear reactor in response to pressure and/or temperature excursions, and the containment of radioactive materials and the prevention of release of said materials from the nuclear plant, may be improved.

It will be understood that, as described herein, a "check valve" may be interchangeably referred to as a non-return valve, a reflux valve, a retention valve, a one-way valve, or the like and will be understood to refer to a valve that is configured to allow fluid (e.g., liquid and/or gas) to flow through the valve in only one direction (e.g., selectively enabling one-way flow) based on selectively actuating between a closed position in which the one-way flow is inhibited and an open position in which the one-way flow is enabled. Check valves as described herein may include any type of check valve that is well-known with regard to selectively enabling one-way fluid flow, including, without limitation, swing check valves, tilting disc check valves, clapper valves, stop-check valves, lift-check valves, in-line check valves, pneumatic non-return valves, any combination thereof, or the like.

It will be understood that, as described herein, a "fusible plug" may include any type of fusible plug that is configured to at least partially melt in response to at least a portion of the fusible plug being exposed to a temperature that reaches (e.g., is equal to or greater than) a threshold temperature. For example, a fusible plug as described herein may include a body cylinder (at least partially comprising a body material) that includes a conduit extending throughout the length of the metal cylinder along its longitudinal axis, between opposite ends of the fusible plug, and where the conduit is filled with a particular material (also referred to as a "fusible alloy") that is configured to melt at a melting temperature that is less than the melting temperature of the body material of the body cylinder, such that the particular body material may partially or entirely melt when a temperature at least one end of the body cylinder reaches the melting temperature, such that the particular fusible alloy material may at least partially flow out of the conduit to expose the conduit through the body cylinder and between the opposite ends of the fusible plug. Fusible plugs as described herein may include any well-known fusible plugs, including, without limitation, fusible plugs having a body material that includes brass, bronze, steel, and/or gun metal, fusible plugs having a fusible alloy that includes tin, any combination thereof, or the like.

The passive containment cooling system may include multiple coolant channels that are coupled to the coolant reservoir via separate, respective coolant supply conduits and coolant return conduits, and the passive containment cooling system may include one or more separate first check valve assemblies extending into separate, respective coolant conduits or other pathways to the coolant reservoir. Additionally, multiple check valve assemblies may extend into a given coolant channel or other pathway to the coolant reservoir, at a same or different heights or depths within the given coolant channel or other pathway to the coolant reservoir, and one or multiple fusible plugs may extend into a given coolant channel or other pathway to the coolant reservoir, and a same or different heights or depths within the given coolant channel or other pathway to the coolant reservoir.

Figure 2C:
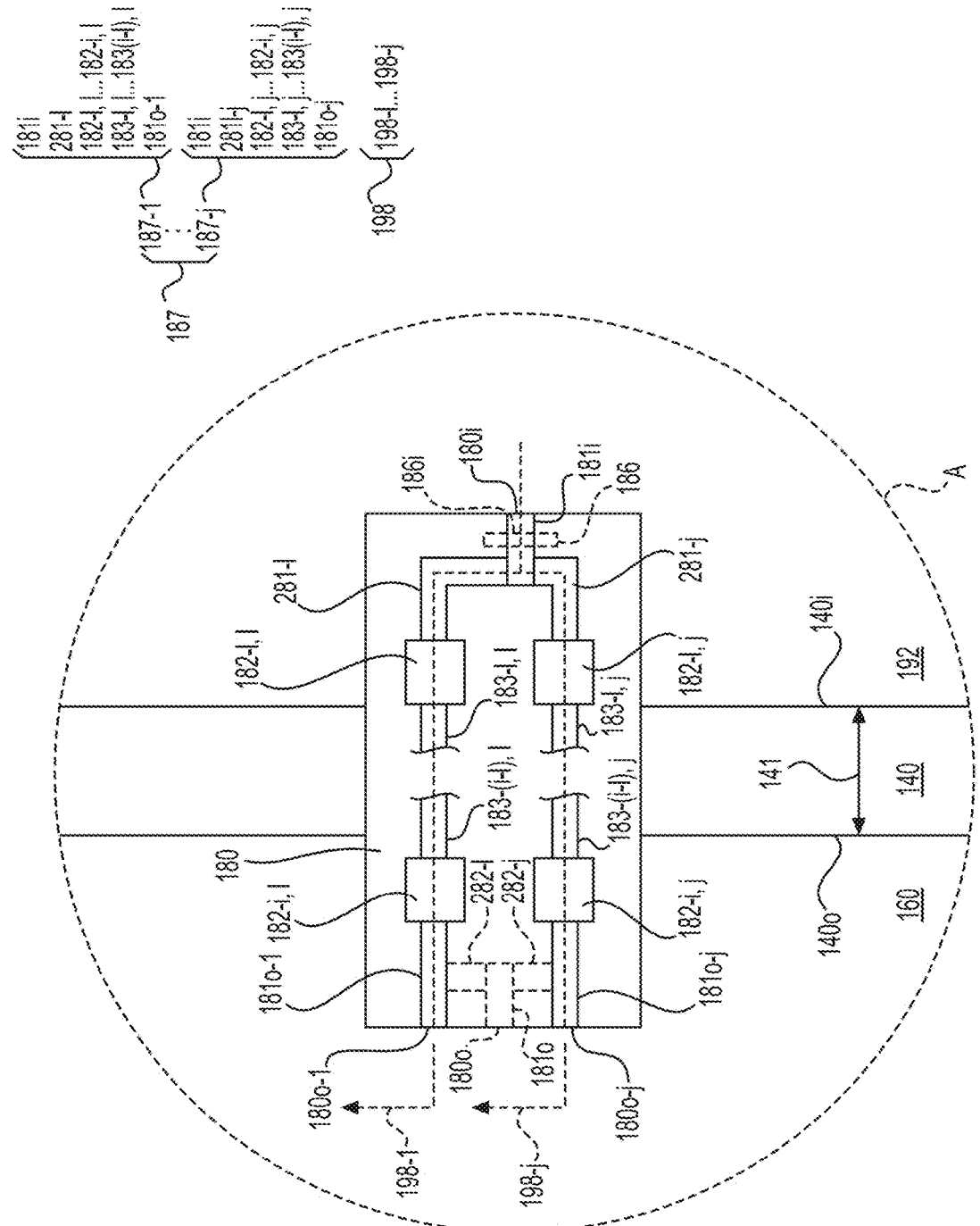
Figure 3:
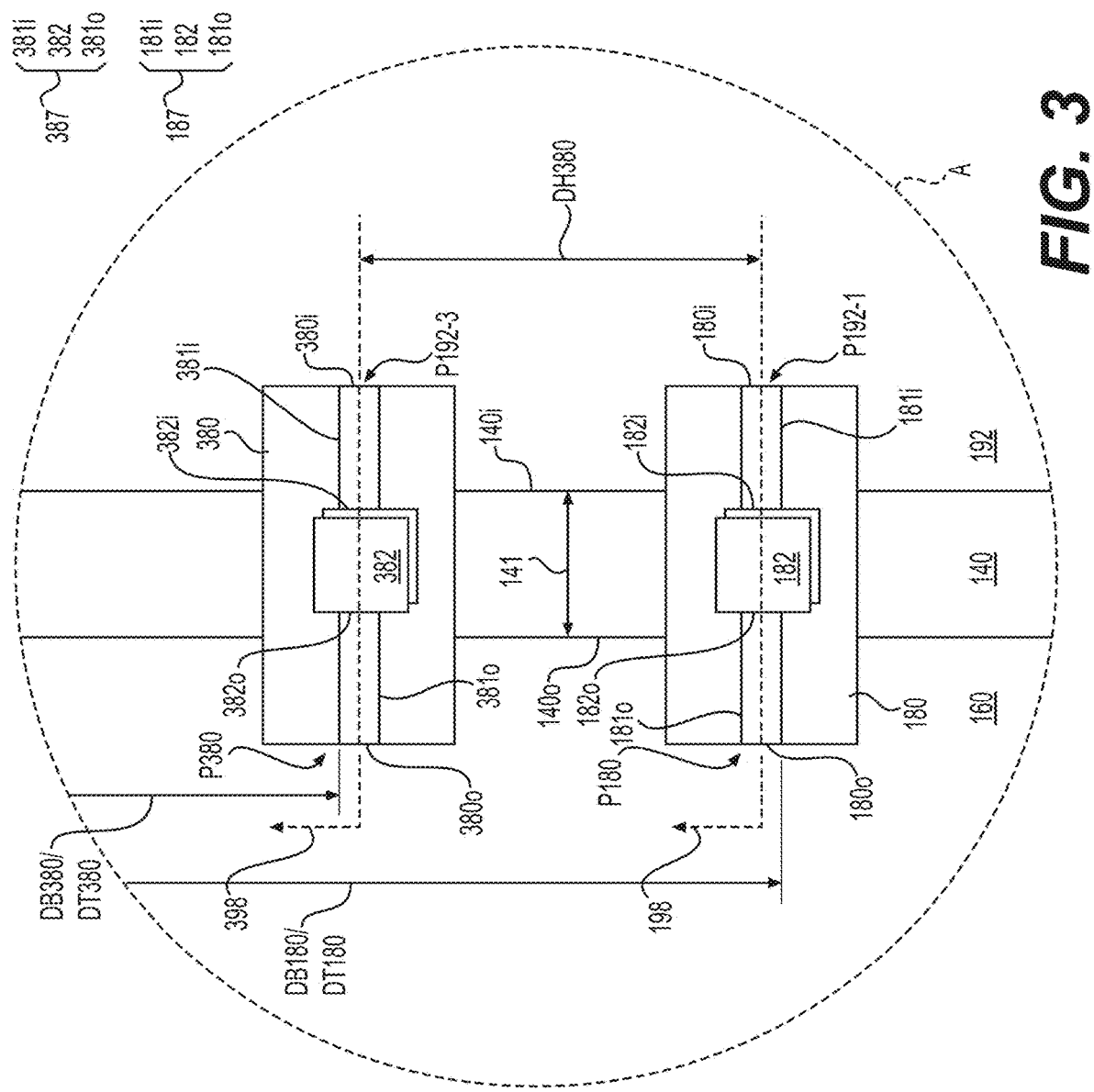
FIG. 3 is an expanded view of region A of FIG. 1, according to some example embodiments.
Figure 5:
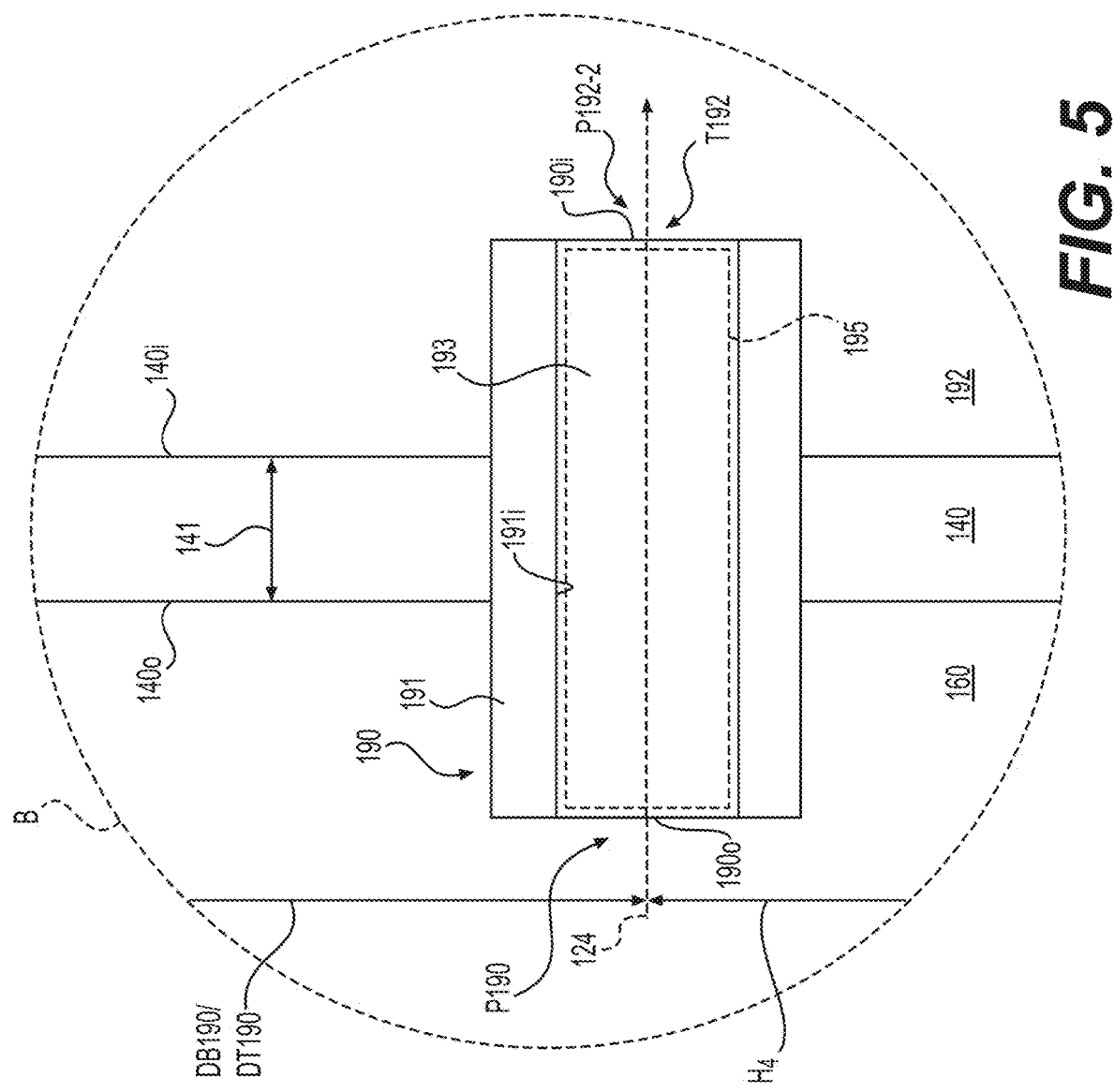
FIG. 5 is an expanded view of region B of FIG. 1, according to some example embodiments.
Figure 6:
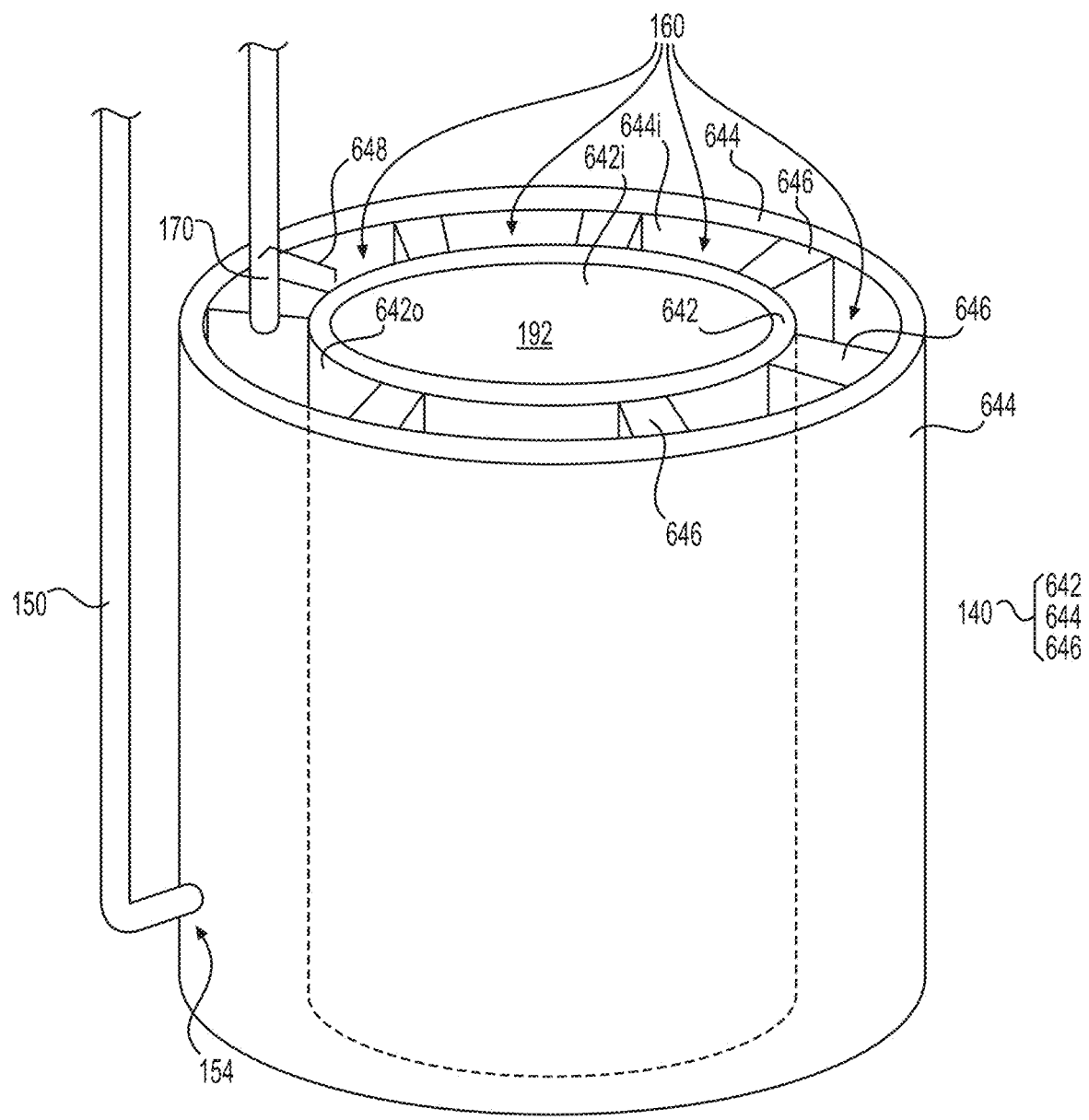
FIG. 6 is a perspective view of a passive containment cooling system that includes one or more coolant channels integrated into the containment structure, according to some example embodiments.

FIG. 1 is a cross-sectional schematic side view of a nuclear plant that includes a passive containment cooling system that further includes a containment venting system and a containment flooding system, according to some example embodiments. FIGS. 2A-2C are expanded views of region A of FIG. 1, according to some example embodiments. FIG. 3 is an expanded view of region A of FIG. 1, according to some example embodiments. FIG. 5 is an expanded view of region B of FIG. 1, according to some example embodiments. FIG. 6 is a perspective view of a passive containment cooling system that includes one or more coolant channels integrated into the containment structure, according to some example embodiments.

Referring to FIG. 1, the nuclear plant 1 includes a reactor building structure 110 on a foundation 2 (which may be the ground, bedrock, a structural foundation, any combination thereof, or the like), and a nuclear reactor 100 within the reactor building structure 110. The nuclear reactor 100 is within a containment environment 192 that is surrounded by, and is at least partially defined by, a containment structure 140 that provides pressure retention of the containment environment 192. An inner surface 140i of the containment structure 140 may at least partially define the containment environment 192. The containment structure 140 may be a solid structure, comprised of one or more pieces of material coupled together, and may include metal and/or concrete material pieces. In some example embodiments, the containment structure 140 may be a steel-concrete composite (SC) structure, as the term is well-known.

As shown in FIG. 1, the nuclear plant 1 includes a passive containment cooling system 200 that is configured to provide passive cooling and containment of the containment environment 192, and the containment fluid 197 included therein, and of the nuclear reactor 100 included therein. The passive containment cooling system 200 includes a coolant reservoir 120, one or more coolant supply conduits 150, one or more coolant channels 160 coupled to the containment structure 140, and one or more coolant return conduits 170. As shown, the passive containment cooling system 200 may include one or more check valve assemblies 180, but example embodiments are not limited thereto. The passive containment cooling system 200 is configured to provide passive cooling of the containment environment 192 based on inducing and/or maintaining a flow or circulation of coolant fluid 122, 124, 125, 126 between the coolant reservoir 120 and the one or more coolant channels 160 to absorb heat 102 rejected by the nuclear reactor 100 and remove the heat to the coolant reservoir 120.

As shown in FIG. 1, the passive containment cooling system 200 may include multiple coolant channels 160 that are coupled to separate portions of the containment structure 140 and which are coupled to the coolant reservoir 120 via separate, respective coolant supply conduits 150 and separate, respective coolant return conduits 170, and where separate, respective check valve assemblies 180 extend into separate, respective coolant channels 160, or one or more other pathways to the coolant reservoir 120, and, if needed, through the containment structure 140 thickness 141 to the separate, respective coolant channels 160 or the one or more other pathways to the coolant reservoir 120, and where separate, respective fusible plugs 190 extend into the separate, respective coolant channels 160 or one or more other pathways to the coolant reservoir 120 and, if needed, through the containment structure 140 thickness 141 to the separate, respective coolant channels 160 or the one or more other pathways to the coolant reservoir 120. The following description is directed to a single coolant channel 160 and the respective conduits 150, 170 and check valve assemblies 180, 380 and fusible plugs 190 extended thereinto, but it will be understood that said description may apply to all of the coolant channels 160, conduits 150, 170, check valve assemblies 180, 380 (second check valve assembly 380 is shown in FIG. 3), and fusible plugs 190 of the passive containment cooling system 200.

As shown in FIG. 1, the coolant reservoir 120 is located vertically above the nuclear reactor 100, such that a top of the nuclear reactor 100 is located at a vertical height H1, and the bottom 120b of the coolant reservoir 120 is at a vertical height H2, where H2 is greater than H1. Accordingly, any fluid held in the coolant reservoir 120 may flow downwards (e.g., flow downwards or "fall" in the direction of gravitational acceleration "g") from the coolant reservoir 120 to a height of any portion of the nuclear reactor 100.

All heights H1 to H6 as described herein will be understood to be heights measured from a single, fixed reference height H0. As illustrated in FIG. 1, the heights H1 to H6 are shown to be heights from a top surface of the foundation 2 at a height H0, such that the top surface of the foundation 2 provides the reference height H0 via which the heights H1 to H6 of other elements in the nuclear plant 1 may be described and compared. But, it will be understood that, in some example embodiments, the top surface of the foundation 2 may have a variable height, and the heights H1 to H6 described herein may be understood to be heights from a single, constant reference height H0 that may be different from the height of the top surface of the foundation 2 (e.g., a height of global mean sea level (MSL), as the term is well-known).

As shown in FIG. 1, the coolant reservoir 120 is configured to hold (e.g., be filled with) a coolant fluid 122, such that the top surface 122t of the coolant fluid 122 in the coolant reservoir 120 is at a depth D122 above the height (H2) of the bottom 120b of the coolant reservoir 120. Accordingly, it will be understood that the hydrostatic pressure of the coolant fluid 122 at the bottom 120b of the coolant reservoir 120 is equal to a pressure head of coolant fluid 122 having a height equal to depth D122. As shown in FIG. 1, and as described further below, the coolant reservoir 120 may be considered to have an upper region 121a and a lower region 121b that is below the upper region 121a (e.g., proximate to the bottom 120b and distal to the top surface 122t in relation to the upper region 121a). Additionally, the coolant fluid 122 held in the coolant reservoir 120 may include coolant fluid 123a, that is defined as the portion of the coolant fluid 122 that is within the upper region 121a, and lower coolant fluid 123b, that is defined as the portion of the coolant fluid 122 that is within the lower region 121b.

As shown in FIG. 1, a coolant supply conduit 150 is coupled to the coolant reservoir 120, such that an inlet 152 of the coolant supply conduit 150 is open to the lower region 121b of the coolant reservoir 120 (e.g., opens directly into the lower region 121b of the coolant reservoir 120) and the coolant supply conduit 150 extends downwards (e.g., in the direction of gravitational acceleration "g") from the inlet 152, downwards from the bottom 120b of the coolant reservoir 120, to an outlet 154. As shown, the inlet 152 may be at a vertical height H3, and the outlet 154 may be at a vertical height H4, where H3 is greater than H4, H4 is less than H1, and where H3 is equal to or greater than H2. Accordingly, it will be understood that, based on extending downwards from the bottom 120*b* of the coolant reservoir 120, the coolant supply conduit 150 may be configured to direct at least some of the coolant fluid 122 in the coolant reservoir 120 (e.g., coolant fluid 123*b* in the lower region 121*b*) to flow, as coolant fluid 124, downwards (e.g., at least partially in the direction of gravitational acceleration "g") from the coolant reservoir 120 and into the coolant supply conduit 150 via inlet 152, and to flow at least partially downwards (e.g., "fall") through the coolant supply conduit 150 to the outlet 154, according to gravity (e.g., gravitational acceleration). Accordingly, it will be understood that a flow of coolant fluid 124 through the coolant supply conduit 150 may be induced and/or maintained according to gravity, and thus may be induced and/or maintained without operation of any active flow generators (e.g., pumps) and without (e.g., independently of) operator or control system intervention and thus the flow may be considered to be "passive."

As shown in FIG. 1, the inlet 152 of the coolant supply conduit 150 may be elevated above the bottom 120*b* of the coolant reservoir 120 by a spacing height H152. In FIG. 1, H152 is shown to be a positive value, such that the height H3 of the inlet 152 is greater than the height H2 of the bottom 120*b* of the coolant reservoir 120. But, it will be understood that, in some example embodiments, the inlet 152 may be at the same height as the bottom 120*b* of the coolant reservoir 120 (e.g., H2 may equal H3), such that height H152 may be a null value. Additionally, while FIG. 1 illustrates the bottom 120*b* of the coolant reservoir 120 as being a flat, horizontal surface (e.g., being perpendicular to the direction of gravitational acceleration "g"), it will be understood that example embodiments are not limited thereto, and in some example embodiments the height H3 of the bottom 120*b* may be understood to be a lowest height of the bottom 120*b* of the coolant reservoir 120. For example, in some example embodiments, the bottom 120*b* may be angled (e.g., have a truncated conical shape) where the inlet 152 is at the height of the lowest portion of the bottom 120*b* (e.g., H3=H2), so that coolant fluid 123*b* in the lowest portion of the coolant reservoir 120 may be drawn downwards, into the inlet 152 according to gravity.

Still referring to FIG. 1, the nuclear plant 1 includes one or more coolant channels 160 that are coupled to the containment structure 140, such that each coolant channel 160 extends vertically along the containment structure 140, from a coolant channel inlet 162 at a bottom of the coolant channel 160 to a coolant channel outlet 164 at a top of the coolant channel 160.

In FIG. 1, the coolant channels 160 are illustrated as conduits (e.g., pipes) coupled to the outer surface 140*o* of the containment structure 140 (which may be implemented via any well-known methods of joining conduits to separate structures. It will be understood that the coolant channels 160, in some example embodiments, may be coupled to the inner surface 140*i* of the containment structure 140 instead of the outer surface 140*o*, for example to satisfy one or more physical constraints). But, it will be understood that example embodiments of coolant channels 160 are not limited thereto. For example, turning to FIG. 6, in some example embodiments, a containment structure 140 may include a concentric arrangement of an inner cylindrical shell 642 and an outer cylindrical shell 644, where the inner surface 642*i* of the inner cylindrical shell at least partially defines the containment environment 192, and where the outer surface 642*o* of the inner cylindrical shell 642 and the inner surface 644*i* of the outer cylindrical shell collectively define an annular gap space 648 in which one or more coolant channels 160 may be defined, e.g., by surfaces 642*o* and 644*i* alone or in combination with additional structural surfaces. For example, in FIG. 6, one or more column structures 646 extend vertically through the annular gap space 648, and further extend completely between surfaces 642*o* and 644*i*, to azimuthally partition the annular gap space 648 into multiple, isolated coolant channels 160, where a given coolant supply conduit 150 and coolant return conduit 170 may be coupled to a particular coolant channel 160. The coolant channels 160 shown in FIG. 6, being defined by the structures 642, 644, 646 that at least partially comprise the containment structure 140, extend through the interior of the containment structure 140 and may be understood to be integrated into the containment structure 140.

As shown in FIG. 1, the inlet 162 of a coolant channel 160 may be coupled to an outlet 154 of the coolant supply conduit 150, such that the inlet 162 is at a same height as the height of the outlet 154 of the coolant supply conduit 150: height H4. As further shown, the height H5 of the outlet 164 of the coolant channel 160 at the top of the coolant channel 160 may be less than the height H2 of the bottom 120*b* of the coolant reservoir 120, but example embodiments are not limited thereto and in some example embodiments the coolant channel 160 may extend vertically up and above the height of the bottom 120*b* of the coolant reservoir 120, such that H5 may be greater than H2. In some example embodiments, the coolant return conduit 170 as described herein may be incorporated into an upper portion of the coolant channel 160 that extends above the height H1 of the nuclear reactor 100 to the height H6 of the outlet 174.

As shown in FIG. 1, coolant fluid 124 that is directed to fall through the coolant supply conduit 150 to the outlet 154 according to gravity may be directed into the bottom of a coolant channel 160, at height H4 via the inlet 162 that is coupled to the outlet 154. As shown, the coolant channel 160 is coupled to the containment structure 140 and thus is configured to receive heat 102 rejected by the nuclear reactor 100 and through the containment environment 192 via at least a portion of the containment structure 140. The coolant fluid 124 that is in the coolant channel 160 may absorb at least some of the heat 102 and thus may become a heated coolant fluid 125. The heated coolant fluid 125 within the coolant channel 160 may have a change in buoyancy (e.g., change in density) based on absorbing said heat 102, such that the buoyancy of the heated coolant fluid 125 is increased (and density is reduced) in relation to the colder coolant fluid 124 that is being directed into the bottom of the coolant channel 160 via the coolant supply conduit 150.

As a result, the heated coolant fluid 125 may rise (e.g., flow upwards, at least partially in a direction that is opposite the direction of gravitational acceleration "g"), from the bottom of the coolant channel 160 at height H4 to the top of the coolant channel 160 at height H5, based on having said increased buoyancy (e.g., reduced density), while the heated coolant fluid 125 is displaced at the bottom of the coolant channel 160 by the colder (and thus less buoyant and denser), newly-supplied coolant fluid 124 via the coolant supply conduit 150. It will be understood that the upwards flow (e.g., rising) of the heated coolant fluid 125 in the coolant channel 160 may be considered to be a "passive" driving of coolant fluid flow, as the flow, being induced by absorbing heat rejected from the nuclear reactor 100, is not being driven by an active flow generator (e.g., a pump), and is not being driven due to operator intervention to specifically control coolant fluid flow. It will be considered that any operator intervention and/or device operation in the nuclear plant 1 that adjust the heat rejection 102 by the nuclear reactor 100, which may indirectly affect coolant fluid 125 flow due to heat 102 absorption, is not considered herein to be operator intervention and/or device operation in the nuclear plant 1 to control coolant fluid flow.

Still referring to FIG. 1, a coolant return conduit 170 is coupled, at an inlet 172, to the outlet 164 of a coolant channel 160 at the top of the coolant channel 160 (e.g., at height H5) and extends upwards to an outlet 174 that is at a greater height H6. As further shown in FIG. 1, the outlet 174 is open to the upper region 121a of the coolant reservoir 120. FIG. 1 illustrates the coolant return conduit 170 as extending upwards through the bottom 120b of the coolant reservoir 120 to a height H174 above the bottom 120b, such that the outlet 174 is upwards facing, similarly to the inlet 152 of the coolant supply conduit 150. But, it will be understood that example embodiments are not limited thereto. For example, the coolant return conduit 170 may extend upwards to height H6 and may turn and extend through a sidewall 120s of the coolant reservoir 120 so that the outlet 174 faces sideways (e.g., perpendicular to the direction of gravitational acceleration "g").

As shown, heated coolant fluid 125 that rises to the top of the coolant channel 160, at height H5, may be directed through outlet 164, and thus through the coupled inlet 172, such that the coolant return conduit 170 may be configured to direct a flow of the heated coolant fluid 125 to rise out of the top of the coolant channel 160 via the coolant channel outlet 164, as coolant fluid 126, and into the coolant reservoir 120 via conduit 170 and outlet 174, according to the increased buoyancy of the hotter coolant fluid 126 (due to having absorbed heat 102 as heated coolant fluid 125) at the top of the coolant channel 160 (e.g., at height H5) over a buoyancy of the colder coolant fluid 124 at the bottom of the coolant channel 160. In some example embodiments, the coolant supply conduit 150 and/or coolant return conduit 170 may be partially or completely insulated so as to mitigate heat loss by the coolant fluid 126 which might affect the upwards, buoyancy-driven flow of coolant fluid 126 and/or the downwards, gravity and/or density-driven flow of coolant fluid 124.

Referring back to the coolant reservoir 120, the coolant reservoir 120 may be considered to be vertically divided into an upper region 121a and a lower region 121b, where the interface between the upper and lower regions 121a and 121b may be any height between the height H174 of the coolant return conduit outlet 174 from the bottom 120b of the coolant reservoir 120 (at height H2) and the height H152 of the coolant supply conduit inlet 152 from the bottom 120b of the coolant reservoir 120 (at height H2). In some example embodiments, the height H121 of the interface between the upper and lower regions 121a and 121b is a height H121 that is equally vertically distant from (e.g., halfway between) height H152 and height H174. In some example embodiments, the height H121 of the interface between the upper and lower regions 121a and 121b is the height H174 of the outlet 174 in the coolant reservoir 120, such that all portions of the coolant reservoir between height H2 and H6 are the lower region 121b, and all portions of the coolant reservoir 120 at or above height H6 are the upper region 121a.

As shown in FIG. 1, the coolant supply conduit inlet 152 is open to the lower region 121b of the coolant reservoir 120, and the coolant return conduit outlet 174 is open to the upper region 121a of the coolant reservoir 120. It will be understood that, due to warmer coolant fluid 122 having increased buoyancy over colder coolant fluid 122, the coolant fluid 123a in the upper region 121a of the coolant reservoir 120 may be warmer, and have increased buoyancy, over the coolant fluid 123b in the lower region 121b of the coolant reservoir 120. It will be understood that warmer coolant fluid 126 may have an increased buoyancy (e.g., reduced density) over colder coolant fluid 122 in the coolant reservoir 120, including the coolant fluid 123b in the lower region 121b of the coolant reservoir 120. Accordingly, warmer coolant fluid 126 may occupy the upper region 121a, becoming part of the warmer, more buoyant coolant fluid 123a, while colder coolant fluid 122 may occupy the lower region 121b as coolant fluid 123b.

Thus, as shown in FIG. 1, colder coolant fluid 122 occupying the lower region 121b of the coolant reservoir 120 (e.g., coolant fluid 123b) may be drawn into the coolant supply conduit 150, according to gravity and having less buoyancy (e.g., greater density) than the warmer coolant fluid 123a, via the inlet 152 that is open to (e.g., located within) the lower region 121b. Accordingly, the passive containment cooling system may supply colder, higher-density coolant fluid 123b to the coolant channel 160 as coolant fluid 124, while warmer coolant fluid 126 may be caused to rise above the colder coolant fluid 123b, as coolant fluid 123a, and thus be isolated from being inadvertently drawn into the coolant supply conduit 150 via inlet 152, based on the increased buoyancy (e.g., reduced density) of the coolant fluid 126 over the colder coolant fluid 123b in the lower region 121b. Furthermore, as shown in FIG. 1, the coolant return conduit outlet 174, being vertically higher in the coolant reservoir 120 than the inlet 152 by a vertical distance of dH152, is open to (e.g., located within) the upper region 121a, such that warmer, lower-density coolant fluid 126 is supplied directly into the upper region 121a to mix with, and become part of, coolant fluid 123a without mixing with the colder coolant fluid 123b in the lower region 121b. The coolant fluid 126 may remain in the upper region 121a as part of coolant fluid 123a, and thus remain isolated from inlet 152, due to having the increased buoyancy due to being warmer than coolant fluid 123b. Over time, at least some of the coolant fluid 123a may cool and may circulate into the lower region 121b to become coolant fluid 123b and thus to eventually be drawn back into the coolant supply conduit 150.

As further shown in FIG. 1, the nuclear plant 1 may include a heat removal system (e.g., heat exchanger 128, which may be any well-known heat exchanger device) that is configured to remove the heat 102 introduced into coolant reservoir 120 by the coolant fluid 126, to thereby mitigate or prevent the risk of the coolant fluid 122 warming up, and thus potentially degrading the ability of the passive containment cooling system 200 to remove heat 102 from the containment environment 192. However, it will be understood that the coolant reservoir 120 may, at least temporarily, serve as a heat sink that may absorb and retain the heat 102 that is removed into the coolant reservoir via the coolant fluid 126, for at least a period of time, without the heat 102 being removed from the coolant reservoir 120 via operation of any heat exchanger 128. Accordingly, the passive containment cooling system 200 may enable a passively-driven (e.g., driven by gravity via coolant supply conduit 150 and via absorbed heat via coolant channel 160 and coolant return conduit 170) circulation of coolant fluid 122, 124, 125, 126 between the coolant reservoir 120 and the coolant channel 160 to remove heat 102 from the containment environment 192. It will be understood that absorbing heat 102 that is rejected by the nuclear reactor 100 via the containment environment 192 and at least a portion of the containment structure 140, as performed by the coolant fluid 125, amounts to removing heat from the containment environment 192.

It will be understood that the flow rate of the coolant fluid 124, 125, 126 may be at least partially driven by the rate of heat rejection 102 by the nuclear reactor 100. Accordingly, the rate of heat removal from the containment environment 192 and into the coolant reservoir 120 by the coolant fluid may be proportional to the coolant flow rate through conduits 150, 170, and coolant channel 160, and such flow rate may be driven by and proportional to the rate of heat rejection 102 by the nuclear reactor 100. Such variation of flow and heat removal by the passive containment cooling system 200 may be partially or entirely driven by the rate of heat rejection 102 by the nuclear reactor 100 and may be performed without (e.g., independently of) any operator intervention in the nuclear plant 1, even without any such intervention with regard to operation of the nuclear reactor 100. Accordingly, the passive containment cooling system 200 may enable regulation of the temperature and/or pressure of the containment environment 192, at least temporarily, without (e.g., independently of) any operator or control system intervention.

Still referring to FIG. 1, and referring further to FIGS. 2A-2C, the passive containment cooling system 200 may include a first check valve assembly 180 at a position that is a vertical depth DB180 below a bottom 120b of the coolant reservoir 120 and thus at a vertical depth DT180 below a top surface 122t of coolant fluid 122 in the coolant reservoir 120, where the first check valve assembly 180 is in fluid communication with both the coolant reservoir 120 and with the containment environment 192. As shown in FIG. 1, the first check valve assembly 180 may extend through the thickness 141 of the containment structure 140 (e.g., between surfaces 140i and 140o) and into the coolant channel 160, so as to be in fluid communication with the coolant reservoir 120 via the coolant channel 160, but example embodiments are not limited thereto and the outlet 180o of the first check valve assembly 180 may be open to another, separate conduit (also referred to interchangeably herein as a "pathway") other than any coolant channel 160 at vertical depth DB180/DT180, where the other, separate conduit is in fluid communication with the coolant reservoir 120 and thus establishes fluid communication between the first check valve assembly 180 and the coolant reservoir 120. It will be understood that the vertical depth DT180 is equal to a sum of the vertical depth DB180 and the coolant reservoir depth D122 of coolant fluid 122, from the bottom 120b to the top surface 122t, in the coolant reservoir 120. The first check valve assembly 180 may include one or more check valves 182 coupled between a first check valve assembly inlet 180i, via an inlet conduit 181i, and a check valve assembly outlet 180o, via an outlet conduit 181o. As shown, the first check valve assembly inlet 180i is open to the containment environment 192, and the first check valve assembly outlet 180o is in fluid communication with the coolant reservoir 120 at vertical depth DB180/DT180 (e.g., is open to the coolant channel 160 or any other conduit to the coolant reservoir 120 at the vertical depth DB180/DT180).

In some example embodiments, the one or more check valves 182 are configured to actuate to open (e.g., actuate from a closed state to an open state), thereby establishing a continuous flow conduit 187 (also referred to herein as a fluid conduit) between the inlet 180i and the outlet 180o and thus enabling a one-way flow 198 of some or all fluids located in the containment environment 192, such fluids being referred to herein as a containment fluid 197, to the coolant reservoir 120 in response to a magnitude of the pressure at the inlets 182i of the one or more check valves 182 being equal to or greater than a first threshold magnitude (e.g., PX1). Such configuration may be based on the one or more check valves 182 being structurally configured (e.g., based on including a spring-loaded actuator) to open in response to the pressure at the inlet 182i of the one or more check valves 182 being equal to or greater than the first threshold magnitude PX1) As shown in FIG. 1 and FIGS. 2A-2C, the one or more check valves 182 may have an inlet 182i that is coupled, via an inlet conduit 181i, to the inlet 180i that is open to the containment environment 192, such that the pressure at the inlet 182i of the one or more check valves 182 may be the same as (e.g., equal to) the pressure P192-1 of the containment environment at the inlet 180i of the first check valve assembly 180. Thus, the one or more check valves may be configured to open in response to the pressure P192-1 reaching (e.g., being equal to or greater than) the first threshold magnitude PX1.

The first threshold magnitude PX1 may at least partially correspond to a hydrostatic pressure P180 of the coolant fluid 125 in the coolant channel 160 or other similar pathway to the coolant reservoir 120 at the first check valve assembly outlet 180o at the vertical depth DB180/DT180. It will be understood that the hydrostatic pressure P180 may be equal to a pressure head of the coolant fluid 122, 124, 125, and/or 126 having a height equal to the vertical depth DT180. In some example embodiments, the coolant reservoir 120 may be configured to be filled with coolant fluid 122 to a reservoir depth D122 such that the top surface 122t of the coolant fluid 122 in the coolant reservoir 120 is at a particular depth D122 above the bottom 120b of the coolant reservoir 120 throughout operation of the nuclear plant 1.

In some example embodiments, the first reservoir depth D122 may vary based on the variation in amount of coolant fluid 122 in the coolant reservoir 120. In some example embodiments, a reference hydrostatic pressure P180 may be a hydrostatic pressure P180 that results from the coolant reservoir 120 being filled to a particular, reference depth D122, such that the reference hydrostatic pressure P180 may be equal to a pressure head of the coolant fluid 122, 124, 125, and/or 126 having a height equal to the vertical depth DT180 when the coolant reservoir 120 is filled with coolant fluid 122 to the particular reference depth D122. The one or more check valves 182 may be configured to actuate to the open state in response to the magnitude of the pressure at the one or more inlets 182i (and thus, for at least one of the check valves 182, the pressure P192-1 of the containment environment at the inlet 180i) reaching (e.g., being equal to or greater than) a first threshold magnitude PX1 that is at least greater than the reference hydrostatic pressure P180, such that, when the coolant reservoir 120 is filled to the particular reference depth D122, a pressure gradient is present across the one or more check valves 1182 when the magnitude of the pressure P192-1 reaches the first threshold magnitude PX1. It will be understood that, due to variation at any given time in the depth D122 to which the coolant reservoir 120 may be filled with coolant fluid 122, the first threshold magnitude PX1 may be set to be a magnitude that is at least a particular margin (e.g., 5% greater, 10% greater, 20% greater, a particular additional amount of pressure, any combination thereof, or the like) greater than the reference hydrostatic pressure P180 (e.g., the hydrostatic pressure P180 at the outlet 180o when the coolant reservoir 120 is filled to the particular reference depth D122), to improve the likelihood that the actual hydrostatic pressure P180 will be less than the first threshold magnitude PX1 at the inlets 182i of the one or more check valves 182 when the magnitude of the pressure P192-1 reaches the first threshold pressure PX1, thereby ensuring that a pressure gradient is present across the first check valve assembly 180 from the inlet 180i to the outlet 180o. It will be understood that, because the inlet 180i of the first check valve assembly 180 is at the same vertical depths DB180/DT180 as the rest of the first check valve assembly 180, the pressure P192-1 of the containment environment 192 at the inlet 180i may be understood to be a pressure P192-1 of the containment environment 192 at the vertical depth DB180/DT180.

The one or more check valves 182 may be configured to selectively (e.g., reversibly) actuate based on whether a pressure at the inlet 182i of the one or more check valves 182 is equal to or greater than the first threshold magnitude PX1. Accordingly, the first check valve assembly 180 may be configured to selectively open a flow conduit 187 to selectively enable one-way flow 198 of a containment fluid 197, from the containment environment 192 to the coolant reservoir 120 via the first check valve assembly 180 and one or more coolant channels 160, or other pathway to the coolant reservoir 120, to which the outlet 180o is open, based on the one or more check valves 182 actuating to open (e.g., opening) in response to a pressure P192-1 of the containment environment 192 at the first check valve assembly inlet 180i at the vertical depth DB180/DT180 being equal to or greater than the first threshold magnitude PX1. The one-way direction of the one-way flow 198 may be ensured, thereby preventing backflow through the first check valve assembly 180 from the coolant channel 160 or other pathway into the containment environment 192, based on the first check valve assembly 180 defining the flow conduit 187 from inlet 180i to outlet 180o to extend through the one or more check valves 182, where the one or more check valves 182 are configured to enable one-way flow in the direction from inlet 180i to outlet 180o, and the one or more check valves 182 each being configured to open in response to the pressure at the inlet 182i of the check valve 182 at least reaching the first threshold pressure PX1 that is greater than a reference hydrostatic pressure P180 of the coolant fluid 125 at the outlet 180o at the vertical depth DB180/DT180 (e.g., a hydrostatic pressure of coolant fluid 125 that is equal to a pressure head of the coolant fluid at a height equal to depth DT180).

In some example embodiments, the one or more check valves 182 may subsequently close, once pressure P192-1 drops below the first threshold magnitude PX1. Accordingly, the one-way flow of containment fluid 197 may be selectively enabled and inhibited to regulate the pressure within the containment environment.

The selective enabling of one-way flow 198 of containment fluid 197 may be referred to herein as "venting" of the containment fluid 197, for example to regulate the pressure (e.g., P192-1) in the containment environment 192 and thus to mitigate or prevent the risk of overpressure of the containment structure 140.

Operation (e.g., actuation) of the one or more check valves 182 of the first check valve assembly 180 may occur without (e.g., independently of) any operator intervention. Accordingly, the pressure relief, or "venting" functionality provided by the first check valve assembly 180 may be understood to be "passive."

In some example embodiments, where the outlet 180o of the first check valve assembly 180 is open to a coolant channel 160 at vertical depth DB180/DT180, the containment fluid 197, which may include radioactive material, solids, gasses, liquids, any combination thereof, or the like, may be entrained in the rising flow of the heated coolant fluid 125 through the coolant channel 160 and may be thus drawn into the coolant reservoir 120 with the coolant fluid 126. Similarly, where the outlet 180o is open to another pathway to the coolant reservoir 120, the containment fluid 197 may pass from the first check valve assembly 180 to the reservoir 120 via the other pathway. The coolant fluid 125, 126, 122 may quench some gases in the containment fluid 197 (e.g., steam) to thereby reduce the pressure in the coolant reservoir 120, and other parts of the containment fluid 197 may be retained in the coolant reservoir 120, at least temporarily, to reduce or prevent venting or escape of containment fluid 197 to the ambient environment external to the nuclear plant 1. Accordingly, the first check valve assembly 180 may enable improved passive containment of containment fluid while enabling passive regulation of pressure in the containment environment 192.

While FIG. 1 illustrates one or more first check valve assemblies 180 extending into one or more coolant channels 160, it will be understood that example embodiments are not limited thereto. For example, one or more first check valve assemblies 180 of the passive containment cooling system 200 may, instead of extending into a coolant channel 160, be routed to the coolant reservoir 120 via one or more other, separate conduits, which may also be referred to as pathways, parallel pathways, or the like, into which the one or more first check valve assemblies 180 may extend. For example, a first check valve assembly 180 may extend, from the containment environment 192, into a separate conduit, also referred to as a separate pathway or parallel pathway (not shown in FIG. 1) that may extend to the coolant reservoir 120 independently of the one or more coolant channels 160. Accordingly, in some example embodiments, one or more first check valve assemblies 180 may be configured to enable "venting" of one or more one-way flows 198 of containment fluid 197 to the coolant reservoir 120 independently of (e.g., in parallel with) the one or more coolant channels 160, thereby enabling the coolant reservoir 120 to retain at least some of the material of the coolant fluid 197, independently of the one or more coolant channel 160.

Referring now, generally, to FIGS. 2A-2C, the first check valve assembly 180 may include one or more various configurations of one or more check valves 182 shown therein, although example embodiments are not limited thereto.

As shown in FIG. 2A, the first check valve assembly 180 may include a single check valve 182 having an inlet 182i that is that is coupled to the first check valve assembly inlet 180i via inlet conduit 181i, and thus inlet 182i is open to inlet 180i, and an outlet 182o that is coupled to the first check valve assembly outlet 180o via outlet conduit 181o, and thus outlet 182o is open to outlet 180o. Thus, in some example embodiments, a pressure P192-1 at the inlet 180i may be the pressure at the inlet 182i of the single check valve 182 of the first check valve assembly 180, and the check valve 182 may be configured to actuate from the closed state to the open state in response to the pressure at the inlet 182i reaching a first threshold magnitude PX1. Thus, the check valve 182 may actuate to open in response to the pressure P192-1 at the inlet 180i reaching the first threshold magnitude PX1, to thereby cause the first check valve assembly 180 to selectively establish an open flow conduit 187 between inlet 180i and outlet 180o via the check valve 182 and conduits 181i and 181o, and thus selectively enable the one-way flow 198 of containment fluid 197, based on the pressure P192-1 reaching the first threshold magnitude PX1.

Referring to FIG. 2B, in some example embodiments, the one or more check valves 182 may include a series connection of a plurality of check valves 182-1 to 182-*i* (e.g., a series connection of "i" check valves, where "i" is a positive integer having a value equal to or greater than 2) between the first check valve assembly inlet 180*i* and the first check valve assembly outlet 180*o*. As shown in FIG. 2B, the outlets 182*o* of check valves 182-1 to 182-(*i*-1) may be coupled to the adjacent inlets 182*i* of adjacent check valves in the series connection via intermediate conduits 183-1 to 183-(*i*-1). Each check valve 182 of the plurality of check valves 182-1 to 182-*i* may be configured to actuate to open in response to a pressure at an inlet 182*i* of the each check valve 182 being equal to or greater than the first threshold magnitude PX1. Similarly to FIG. 2A, the inlet 182*i* of the first check valve 182-1 in the series connection may be coupled to, and open to, the inlet 180*i* via inlet conduit 181*i*, and the outlet 182*o* of the last check valve 181-*i* in the series connection may be coupled to, and open to, the outlet 180*o* via outlet conduit 181*o*. Accordingly, when the pressure P192-1 at inlet 180*i*, reaches the first threshold magnitude PX1, the first check valve 182-1 may actuate to open, as the pressure at the inlet 182*i* of the first check valve 182-1 may be the same as the pressure at inlet 180*i*, and then the next check valves 182-2 to 182-*i* in the series connection may actuate to open in succession in response to each preceding check valves 182 in the series connection opening and establishing fluid communication between the inlet 182*i* of the succeeding check valve 182 in the series connection with inlet 180*i*, until all check valves 182-1 to 182-*i* are opened and the flow conduit 187 between inlet 180*i* and outlet 180*o* via check valves 182-1 to 182-*i* is established. Thus, the first check valve assembly 180 may selectively enable the one-way flow 198 of containment fluid 197 based on all check valves 182 of the series connection of the plurality of check valves opening 182-1 to 182-*i* selectively actuating to open. Additionally, the one-way flow 198 may be inhibited in response to any of the check valves 182-1 to 182-*i* being closed. Thus, if the pressure P192-1 subsequently drops below the first threshold magnitude PX1 after initially reaching the first threshold magnitude PX1, the series connection of check valves 182-1 to 182-*i* may reduce the risk that the flow conduit 187 between inlet 180*i* and outlet 180*o* might remain open, as the closure of any one of the check valves 182-1 to 182-*i* would close the flow conduit 187 and inhibit the one-way flow 198. Thus, the series connection shown in FIG. 2B may reduce the risk of inadvertent backflow from the coolant channel 160 or other pathway to which the outlet 180*o* is open and into the containment environment 192 via the first check valve assembly 180, thereby improving reliability of the passive containment cooling system 200.

Referring to FIG. 2C, in some example embodiments, the one or more check valves 182 may include a parallel connection of a plurality of check valves 182-1,1 to 182-*i,j* between inlet 180*i* and one or more outlets 180*o*-1 to 1800-*j* (e.g., a parallel connection of "j" sets of series connections of "i" check valves with at least inlet 180*i*, where "j" is a positive integer that is equal to or greater than 1 and "i" is a positive integer that is equal to or greater than 1). As shown in FIG. 2C, the inlets 182*i* of check valves 182-1,1 to 182-1,*j* may be coupled in parallel to the inlet 180*i* via inlet conduit 181*i* and separate, respective inlet branch conduits 281-1 to 281-*j*. As further shown, each separate branch (1 to j) of one or more (e.g., "i") check valves 182 may be coupled in series between inlet 180*i* and a separate outlet 180*o*-1 to 180*o* j, similarly to the series connection of check valves 182-1 to 182-*i* as described with reference to FIG. 2B. But, example embodiments are not limited thereto, and in some example embodiments, two or more branches 1 to j of check valves 182 may be coupled in parallel between a single inlet 180*i* and a single outlet 180*o*, via one or more branch inlet conduits 281-1 to 281-*j* and one or more branch outlet conduits 282-1 to 282-*j*.

Each check valve 182 of the plurality of check valves 182-1,1 to 182-*i,j* may be configured to open in response to a pressure at an inlet 182*i* of the each check valve 182 being equal to or greater than the first threshold magnitude PX1. Accordingly, when the pressure P192-1 at inlet 180*i* reaches the first threshold magnitude PX1, each of the check valves 182-1,1 to 182-*i,j* may open, as the pressure at the inlet 182*i* of each check valve 182-1,1 to 182-1,*j* may be the same as the pressure at inlet 180*i* and each series connection of one to i check valves in each parallel branch of check valves 182 may actuate in succession as described above with reference to FIG. 2B, thereby establishing multiple, parallel fluid conduits 187-1 to 187-*j* between inlet 180*i* and one or more outlets 180*o*-1 to 180-*j*. Thus, the first check valve assembly 180 may selectively enable the one-way flow 198 of containment fluid 197 based on any set of one or more check valves of the parallel connection of sets of one or more check valves 182-1,1 to 182-*i,j* actuating to open. Where "i" equals 1, such that the first check valve assembly 180 includes a parallel connection of check valves 182-1 to 182-*j*, the first check valve assembly 180 may selectively enable the one-way flow 198 of containment fluid 197 based on any check valve 182 of the parallel connection of check valves 182-1 to 182-*j* actuating to open Accordingly, in some example embodiments, the one-way flow 198 may be ensured, even if one or more of the check valves 182-1 to 182-*j* do not open, so long as at least one (e.g., any) of the check valves 182-1 to 182-*j* open.

Still referring to FIGS. 2A-2C, in some example embodiments a check valve assembly includes a burst disc 186 coupled between the inlet 182*i* of the one or more check valves 182 and the inlet 180*i* of the first check valve assembly 180. For example, as shown in FIGS. 2A-2C, the burst disc 186 may be coupled in series with the one or more check valves 182 of the first check valve assembly 180. The burst disc 186, also known as a pressure safety disc, rupture disk, bursting disc, burst diaphragm, or the like, may be any well-known type of burst disc used to provide a non-reclosing pressure relief flow control (e.g., pressure relief) device. In some example embodiments, the burst disc 186 is configured to rupture in response to a pressure at the inlet side 186*i* of the burst disc 186 reaching the first threshold pressure PX1, or any other particular pressure threshold magnitude (e.g., a particular, or, alternatively, pre-determined "set point" threshold). Because the burst disc 186 may be between the inlet 182*i* of the first check valve 182 of the one or more check valves 182 as shown in FIGS. 2A to 2C, the inlet side 186*i* of the burst disc 186 is in open fluid communication with (e.g., open to) inlet 180*i*, such that the pressure P192-1 at inlet 180*i* is also the pressure at the inlet side 186*i* of the burst disc 186, and thus the burst disc 186 is configured to rupture if the pressure P192-1 reaches the first threshold magnitude PX1, or any other particular pressure threshold magnitude, to cause the pressure at the inlet 182*i* of one or more check valves 182 to reach the pressure P192-1 at inlet 180*i*, and thus the one or more check valves 182 may actuate to the open state to enable one-way flow 198 of the containment fluid 197 therethrough in response to the pressure P192-1 reaching the first threshold magnitude PX1. The burst disc 186 may provide an additional level of reliability to the first check valve assembly 180 based on preventing premature establishment of the flow conduit 187 through the first check valve assembly 180 if pressure P192-1 has not reached the first threshold magnitude PX1 at least once.

Referring back to FIG. 1, while the passive containment cooling system 200 is shown as including one first check valve assembly 180 extending into each separate coolant channel 160 of the passive containment cooling system 200, it will be understood that, in some example embodiments, the passive containment cooling system 200 may include multiple first check valve assemblies 180 that each extend from the containment environment 192, through the thickness 141 of the containment structure 140, into the same coolant channel 160, at a same or different depths below the bottom 120b of the coolant reservoir 120 within the coolant channel 160.

Referring now to FIG. 3, in some example embodiments, the passive containment cooling system 200 may include, in addition to the first check valve assembly 180, one or more additional, or second check valve assemblies 380 at a position that is a vertical depth DB380 below a bottom 120b of the coolant reservoir 120 and thus at a vertical depth DT380 below a top surface 122t of coolant fluid 122 in the coolant reservoir 120, where the one or more second check valve assemblies 380 is in fluid communication with both the coolant reservoir 120 and with the containment environment 192. As shown in FIG. 3, a second check valve assembly 380 may extend through the thickness 141 of the containment structure 240 and into the coolant channel 160 at a vertical depth DB380 below a bottom 120b of the coolant reservoir 120, and thus at a vertical depth DT380 below the top surface 122t of the coolant fluid 122 within the coolant reservoir 120, but example embodiments are not limited thereto and the outlet 380o of the second check valve assembly 380 may be open to another, separate conduit other than any coolant channel 160 at vertical depth DB380/DT380, where the other, separate conduit is in fluid communication with the coolant reservoir 120 and thus establishes fluid communication between the second check valve assembly 380 and the coolant reservoir 120. It will be understood that the vertical depth DT380 is equal to a sum of the vertical depth DB380 and the coolant reservoir depth D122 of coolant fluid 122, from the bottom 120b to the top surface 122t, in the coolant reservoir 120. As shown, the vertical depth DB380 may be less than the vertical depth DB180. For example, where the first and second check valve assemblies 180 and 380 both extend through the containment structure 140 to coolant channel 160 the one or more second check valve assemblies 380 may be located vertically higher in the coolant channel 160, and thus closer to the coolant reservoir 120, than the first check valve assembly 180.

In some example embodiments, the second check valve assembly 380 includes an inlet conduit 381i that is open to the containment environment 192 via inlet 380i, and outlet conduit 381o that is in fluid communication with the coolant reservoir 120 at vertical depth DB380/DT380 (e.g., is open to the coolant channel 160 or any other conduit to the coolant reservoir 120 at depth DB380/DT380), and one or more check valves 382 coupled between the inlet conduit 381i and the outlet conduit 381o. It will be understood that the configuration of conduits and check valves 382 in the second check valve assembly 380 may be any of the configurations that the first check valve assembly 180 may have, including any of the configurations shown in any of FIGS. 2A-2C, such that the second check valve assembly 380 may include any series connection and/or parallel connection of check valves 382 that may be included in the first check valve assembly 180, and the configuration of check valves 382 in the second check valve assembly 380 may be the same as, or different than, the configuration of check valves 182 in the first check valve assembly 180.

Similarly to the first check valve assembly 180, the second check valve assembly 380 is configured to selectively open a flow conduit 387, and thus selectively enable one-way flow 398 of the containment fluid 197, to the coolant reservoir from the containment environment 192, based on the one or more check valves 382 of the second check valve assembly 380 actuating to open in response to a pressure at the inlet(s) 382i of the one or more check valves 382, and thus the pressure P192-3 of the containment environment 192 at the second check valve assembly inlet 380i, and thus the pressure P192-3 in the containment environment 192 at vertical depth DB380/DT380 (where pressure P192-3 may be the same as or different than the pressure P192-1 at any given time) being equal to or greater than (e.g., reaching) a second threshold magnitude PX2. The second threshold magnitude PX2 may be different than the first threshold magnitude PX1. The second threshold magnitude PX2 may at least partially correspond to a hydrostatic pressure P380 of the coolant fluid 125 in the coolant channel 160 at the outlet 380o of the second check valve assembly. Restated, the second threshold magnitude PX2 may at least partially correspond to the hydrostatic pressure P380 of the coolant fluid 125 at depth DT380 below the top surface 122t of the coolant fluid 122 in the coolant reservoir 120, and thus may correspond to (e.g., equal to or be greater than by a particular proportional margin and/or margin magnitude) the pressure head of coolant fluid 122 at depth DT380 of coolant fluid. Similarly to the first threshold magnitude PX1, in some example embodiments the second threshold magnitude PX2 may correspond to (e.g., match or exceed by a particular margin proportion or magnitude) a reference hydrostatic pressure P380 at depth DT380 that results from the coolant reservoir 120 being filled with coolant fluid to the particular reference depth D122.

It will be understood that the one or more check valves 382 of the second check valve assembly 380 may operate in the same manner described herein with reference to the one or more check valves 182 of the first check valve assembly 180 and thus may be configured to provide passive venting of the containment environment 192.

Because the second check valve assembly 380 is spaced vertically above the first check valve assembly 180 in the passive containment cooling system 200 by a vertical spacing distance dH380, and because in some example embodiments pressures P192-3 and P192-1 may be the same magnitude at the same time (e.g., when the containment environment 192 is filled with gas at least between depths DB180/DT180 and DB380/DT380), the one or more check valves 382 of the second check valve assembly 380 may actuate to open and selectively enable one-way flow 398 from the containment environment 192 to the coolant channel 160 via the second check valve assembly 380 when pressure P192-3/P192-1 is equal to a second threshold magnitude PX2 that is greater than the hydrostatic pressure P380 at depth DT380 but is less than the hydrostatic pressure P180 at depth DT180. The one or more check valves 182 of the first check valve assembly 180 may subsequently actuate to open to selectively enable one-way flow 198 in response to pressure P192-3/P192-1 subsequently increasing from the second threshold magnitude PX2 to the first threshold magnitude PX1. It will be understood that the first and second check valve assemblies 180 and 380 may independently actuate to independently selectively enable or inhibit respective one-way flows 198 and 398 of containment fluid 197, and thus the "venting" of containment fluid 197 provided by the passive containment cooling system 200 may be provided at an incremental rate that is proportional to the pressure in the containment environment 192, as more flow conduits 387, 187 may be established by more check valve assemblies 380, 180 as the pressure within the containment environment 192 rises. The quantity of open flow conduits 187, 387 may be increased or reduced as the pressure within the containment environment 192 rises or falls, respectively, and such proportional and independent opening and closing of flow conduits may be implemented without (e.g., independently of) any operator intervention and thus may be understood to be a passive proportional venting capability provided by the passive containment cooling system 200.

While FIG. 3 illustrates only a single second check valve assembly 380, it will be understood that the passive containment cooling system 200 may include any quantity of second check valve assemblies 380 that may be located at same or different vertical heights in the coolant channel 160 and may have separate, respective threshold pressures PX based on the respective depths of the respective second check valve assemblies below the bottom 120b of the coolant reservoir 120. It will be understood that in some example embodiments the passive containment cooling system 200 may not include any second check valve assemblies 380.

While FIG. 3 illustrates a second check valve assembly 380 extending into a coolant channel 160, it will be understood that example embodiments are not limited thereto. For example, a second check valve assembly 380 of the passive containment cooling system 200 may, instead of extending into a coolant channel 160, be routed to the coolant reservoir 120 via one or more other, separate conduits, also referred to as separate pathways or parallel pathways, into which the one or more second check valve assemblies 380 may extend. For example, a second check valve assembly 380 may extend, from the containment environment 192, into a separate conduit, also referred to as a separate pathway or parallel pathway, (not shown in FIG. 1 or 3) that may extend to the coolant reservoir 120 independently of the one or more coolant channels 160. Accordingly, in some example embodiments, one or more second check valve assemblies 380 may be configured to enable "venting" of one or more one-way flows 398 of containment fluid 197 to the coolant reservoir 120 independently of the one or more coolant channels 160, thereby enabling the coolant reservoir 120 to retain at least some of the material of the coolant fluid 197, independently of the one or more coolant channel 160. In some example embodiments, a first check valve assembly 180 may extend into a coolant channel 160 while a second check valve assembly 380 extends into a separate conduit that extends to the coolant reservoir 120 independently of the coolant channel 160 into which the first check valve assembly 180 extends, or any other coolant channel 160. In some example embodiments, a second check valve assembly 380 may extend into a coolant channel 160 while a first check valve assembly 180 extends into a separate conduit that extends to the coolant reservoir 120 independently of the coolant channel 160 into which the second check valve assembly 380 extends, or any other coolant channel 160.

It will be understood that, in some example embodiments, the first check valve assembly 180 may be absent from some or all of the coolant channels 160. In some example embodiments, the passive containment cooling system 200 may not include any first check valve assemblies 180.

Still referring to FIG. 1, and further referring to FIG. 5, the passive containment cooling system 200 may include a fusible plug 190 at a bottom vertical depth DB190 below a bottom 120b of the coolant reservoir 120, and thus a depth DT190 below the top surface 122t of the coolant fluid 122 in the coolant reservoir 120, where the fusible plug 190 is in fluid communication with the coolant reservoir 120 and with the containment environment 192. For example, as shown in FIG. 5, the fusible plug 190 may extend, between opposite ends 190i, 190o, through the thickness 141 of the containment structure 140 and into the coolant channel 160 at a bottom vertical depth DB190 below a bottom 120b of the coolant reservoir 120, and thus a depth DT190 below the top surface 122t of the coolant fluid 122 in the coolant reservoir 120, but example embodiments are not limited thereto. For example, the end 190o of the fusible plug 190 may be open to another, separate conduit other than any coolant channel 160 at vertical depth DB190/DT190, where the other, separate conduit is in fluid communication with the coolant reservoir 120 and thus establishes fluid communication between the fusible plug 190 and the coolant reservoir 120. It will be understood that the vertical depth DT190 is equal to a sum of the vertical depth DB190 and the coolant reservoir depth D122 of coolant fluid 122, from the bottom 120b to the top surface 122t, in the coolant reservoir 120. The bottom vertical depth DB190/DT190 may be greater than the first vertical depth DB180/DT180 by a distance dH192, as shown in FIG. 1, such that a hydrostatic pressure P190 of the coolant fluid 124/125 in the coolant channel 160 at the bottom vertical depth DB190/DT190 (which may be a hydrostatic pressure P190 that corresponds to the pressure head of coolant fluid of depth DT190 of coolant fluid) is greater than the hydrostatic pressure P180 of the coolant fluid 125 in the coolant channel 160 at the first check valve assembly outlet 180o (e.g., hydrostatic pressure P180 that corresponds to the pressure head of depth DT180 of coolant fluid).

In some example embodiments, the fusible plug 190 is configured to at least partially melt in response to a temperature T192 in the containment environment 192 at the fusible plug 190 (e.g., at the end 190i of the fusible plug 190 that is open to the containment environment 192) at least meeting a threshold temperature TX, such that the fusible plug 190 exposes a flow conduit 195 extending, between opposite ends 190o and 190i, between the coolant channel 160 or other pathway to the coolant reservoir 120 at the bottom vertical depth DB190/DT190 into the containment environment 192 to at least partially flood the containment environment 192 with at least some of the coolant fluid 124, 125. As shown in FIGS. 1 and 5, the fusible plug 190 may be positioned at the bottom of the coolant channel 160, e.g., at height H4, such that the coolant fluid 124 that passes over the end 190o of the fusible plug 190 that is open to the coolant channel 160, and thus would be the coolant fluid that would flood the containment environment 192 in response to the fusible plug 190 at least partially melting, would be the colder, coolant fluid 124 and would thus provide improved cooling within the containment environment 192. The fusible plug 190 may be any well-known type of fusible plug, including a fusible plug that includes a cylindrical body 191 (e.g., comprising brass, steel, etc.) extending through the thickness 141 of the containment structure 140 and having an inner surface 191*i* defining an inner cylindrical conduit 195 (also referred to herein as a flow conduit, a fluid conduit, or the like) that is filled with a fusible alloy 193 (e.g., tin) that is configured to melt in response to a temperature T192 at the end 190*i* of the fusible plug 190 reaching a threshold temperature TX (e.g., the melting point of the fusible alloy 193) such that the fusible alloy 193 may at least partially melt to open (e.g., expose) the cylindrical conduit 195 extending through the cylindrical body 191 and thus to establish a flow conduit through the fusible plug 190, via the exposed conduit 195, and thus to enable coolant fluid 124 to flow through the conduit 195 and into the containment environment 192. Once introduced into the containment environment 192, the flooding coolant fluid 124 may provide cooling of the containment environment 192 and/or nuclear reactor 100, containment, cooling, and control of radioactive materials in the containment environment (e.g., FCM, LFCM, corium, any combination thereof, o the like), reduce pressure in the containment environment 192 (e.g., via cooling and condensing steam in the containment environment 192), any combination thereof, or the like.

In some example embodiments, the first check valve assembly 180 is configured to, based on the one or more check valves 182 selectively opening in response to the pressure P192-1 in the containment environment 192 at the first check valve assembly inlet 180*i* being equal to or greater than the first threshold magnitude PX1, maintain a pressure P192-2 in the containment environment 192 at the bottom vertical depth DB190/DT190 at a magnitude that is less than the hydrostatic pressure P190 of the coolant fluid 124 in the coolant channel 160 at the bottom vertical depth (e.g., DB190, and thus DT190), to enable flow of coolant fluid 124 through the exposed conduit 195 of the fusible plug 190 and into the containment environment 192 in response to the fusible plug 190 at least partially melting. For example, the first check valve assembly 180 may be vertically spaced apart from the fusible plug 190 by a vertical distance dH192, and the one or more check valves 182 may be configured to actuate to an open state in response to the pressure at the inlets 182*i* of the one or more check valves 182 reaching a threshold pressure PX1 that is less than the hydrostatic pressure P190 in the coolant channel 160 at the depth DB190/DT190 such that 1) the one or more check valves 182 open before the pressure P192-2 reaches the magnitude of the hydrostatic pressure P190, thereby ensuring that P192-2 does not reach the magnitude of hydrostatic pressure P190 and thus a pressure gradient from the coolant channel 160 to the containment environment 192 through the fusible plug 190 is ensured (thereby mitigating or preventing backflow out of the containment environment 192 through the fusible plug 190, and 2) a pressure gradient is present from depths DB190/DT190 to DB180/DT180 within the containment environment 192 when the fusible plug 190 at least partially melts (after the one or more check valves 182 have opened), so that a flow of fluid through the containment environment 192 proceeds from the fusible plug 190 to the first check valve assembly inlet 180*i*. It will be understood that, in some example embodiments, pressure P192-2 in the containment environment 192 at depth DB190/DT190 may be the same as, or different than, pressure P192-1 at the inlet 180*i* of the first check valve assembly 180.

In some example embodiments, the first check valve assembly 180 is configured to selectively enable the one-way flow 198, based on the one or more check valves 182 actuating to open, in response to pressure P192-1 reaching a threshold magnitude PX1 that is lower than a pressure magnitude that corresponds to the temperature T192 at end 190*i* of the fusible plug 190 reaching the threshold temperature magnitude TX. For example, the fusible plug 190 may be configured to at least partially melt when temperature T192, at pressure P192-2, is a particular threshold temperature TX, and the temperature T192 may correspond to the magnitude of pressure P192-2, and the one or more check valves 182 may be configured to actuate to open in response to an inlet-side pressure (e.g., pressure at inlet 182*i*) being at a firs threshold magnitude PX1 that is less than the pressure that corresponds to temperature T192 being the threshold temperature TX. Accordingly, the first check valve assembly 180 may be configured to ensure that the one or more check valves 182 are open, and thus the flow conduit 187 is open and one-way flow 198 is enabled, when the temperature T192 reaches the threshold temperature TX and the fusible plug begins to at least partially melt, such that venting is ensured to be ongoing when the fusible plug 190 at least partially melts to expose conduit 195. Accordingly, the passive containment cooling system 200 may be configured to ensure that conduit 187 is open when conduit 195 is exposed, thereby establishing a conduit into the containment environment 192 via conduit 195 and out of the containment environment 192 via conduit 187.

In some example embodiments, the first check valve assembly 180 and the fusible plug 190 are collectively configured to enable circulation of coolant fluid 124 within the containment environment 192, from the coolant channel 160 to the containment environment 192 via the exposed conduit 195 through the fusible plug 190 at the bottom vertical depth DB190/DT190 and from the containment environment 192 to the coolant channel 160 via the first check valve assembly 180 at the first vertical depth DB180/DT180. Accordingly, coolant fluid may circulate in and out of the containment environment 192 in an upwards flow direction that ensures that colder coolant fluid 124 enters the containment environment 192 via the melted fusible plug 190 flow conduit 195 and replaces heated coolant fluid within the containment environment 192, and the heated coolant fluid in the containment environment 192 is removed from the containment environment 192 via the first check valve assembly 180 to be returned to the coolant reservoir 120 to retain any entrained radioactive materials and thus to at least temporarily retain said materials within the nuclear plant 1, thereby improving containment.

It will be understood that multiple fusible plugs 190 may extend through the thickness 141 of the containment structure 140, from the containment environment 192, to a same, common coolant channel 160, at a same or different depths from the bottom 120*b* of the coolant reservoir 120 within the coolant channel 160.

While FIG. 1 illustrates one or more fusible plugs 190 extending into one or more coolant channels 160, it will be understood that example embodiments are not limited thereto. For example, one or more fusible plugs 190 of the passive containment cooling system 200 may, instead of extending into a coolant channel 160, be routed to the coolant reservoir 120 via one or more other, separate conduits, also referred to as separate pathways or parallel pathways, into which the fusible plug 190 may extend. For example, a fusible plug 190 may extend, from the containment environment 192, into a separate conduit, also referred to as a separate pathway or parallel pathway, (not shown in FIG. 1 or FIG. 5) that may extend to the coolant reservoir 120 independently of the one or more coolant channels 160. Accordingly, in some example embodiments, one or more fusible plugs 190 may be configured to enable at least partial flooding of the containment environment 192 via coolant fluid that is supplied to the fusible plug 190 via a pathway from the coolant reservoir 120 that is separate and independent of the one or more coolant channels 160 of the passive containment cooling system 200. It will be understood that, in some example embodiments, a fusible plug 190 may extend into a conduit, or pathway, to the coolant reservoir 120 that is independent of (e.g., coupled to the coolant reservoir 120 in parallel with) a conduit, pathway, or coolant channel 160 into which a first check valve assembly 180 and/or second check valve assembly 380 may extend.

It will be understood that, in some example embodiments, the fusible plugs 190 may be absent from some or all of the coolant channels 160. In some example embodiments, the passive containment cooling system 200 may not include any fusible plugs 190.

Figure 4:
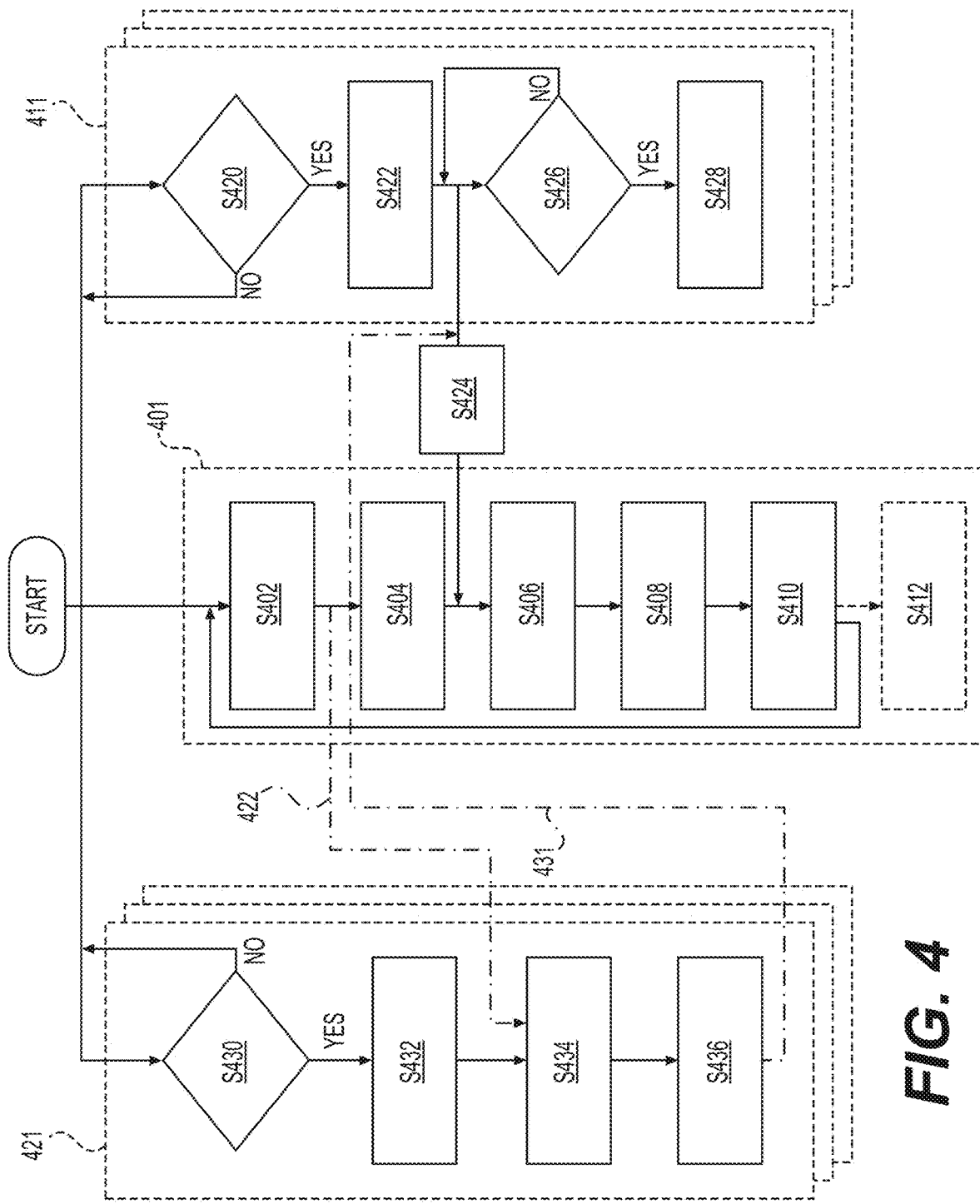
FIG. 4 is a flowchart that illustrates a method of operation of a passive containment cooling system, according to some example embodiments.

FIG. 4 is a flowchart that illustrates a method of operation of a passive containment cooling system, according to some example embodiments. The method shown in FIG. 4 may be performed with regard to any of the example embodiments of passive containment cooling system 200 as described herein, including any of the example embodiments shown in FIGS. 1, 2A-2C, 3, and 5-6.

As shown in FIG. 4, the method may include cooling operations 401, check valve assembly operations 411, and fusible plug operations 421. Operations 401, 411, and 421 may be performed at least partially concurrently (e.g., simultaneously), sequentially, or the like. In some example embodiments, operation 411 may be performed independently of operations 401 and 421. In some example embodiments, operation 421 may be performed independently of operations 401 and 411. In some example embodiments, operations 411 and/or 421 may be omitted such that operation 401 is performed alone. In some example embodiments, operation 421 may be performed in response to the first check valve assembly 180 opening the flow conduit 187 and selectively enabling the one-way flow 198 in operation 411, as the passive containment cooling system 200 may be configured such that a fusible plug 190 of the passive containment cooling system 200 at least partially melts when the temperature T192 is at a magnitude corresponding to a pressure P192-1 at which the one or more check valves 182 of the first check valve assembly 180 are open.

It will be understood that, in some example embodiments, operation 421 may be omitted, for example where the passive containment cooling system 200 does not include any fusible plugs 190.

Referring first to operation 401, At S402, the method may include directing a coolant fluid 124 to flow downwards from a coolant reservoir 120 via a coolant supply conduit 150, according to gravity, to a coolant channel 160 coupled to the containment structure 140 that at least partially defines the containment environment 192 for a nuclear reactor 100, wherein the coolant channel 160 extends vertically along the containment structure 140, such that the coolant fluid 124 is directed into a bottom of the coolant channel 160 according to gravity.

At S404, the coolant fluid 124 in the coolant channel 160 absorbs heat 102 rejected by the nuclear reactor 100 in the containment environment 192 via at least the containment structure 140. Such coolant fluid 124 that absorbs the heat 102 becomes a heated coolant fluid 125 and experiences a change in buoyancy (e.g., an increased buoyancy) and density (e.g., a decreased density) in relation to the buoyancy and density of the colder coolant fluid 124 that is supplied to the bottom of the coolant channel 160.

At S406, the heated coolant fluid 125 rises (e.g., flows upwards) through the coolant channel 160 from the bottom of the coolant channel 160 toward the coolant reservoir 120 via a top of the coolant channel 160 according to the change in heated coolant fluid 125 buoyancy, in relation to coolant fluid 124 buoyancy, resulting from the coolant fluid 125 absorbing heat 102 at S404. The rising heated coolant fluid 125 may be displaced, at the bottom of the coolant channel 160, by fresh, colder coolant fluid 124 via the coolant supply conduit 150.

At S408, the rising heated coolant fluid 125 reaches the top of the coolant channel 160 and continues to rise, through the coolant return conduit 170, as coolant fluid 126, according to the increased buoyancy and reduced density of the coolant fluid 126 over the coolant fluid 124 that is being supplied into the bottom of the coolant channel 160. The coolant fluid 126 rises upwards, through the coolant return conduit 170, and thus, at S410, flows into the upper region 121a of the coolant reservoir 120 via the outlet 174 of the coolant return conduit 170. The coolant fluid 126 may remain in the upper region 121a based on having increased buoyancy and reduced density over the colder coolant fluid 123b in the lower region 121b of the coolant reservoir 120. In some example embodiments, the coolant fluid 126 in the coolant reservoir 120 may cool over time and may sink down into the lower region 121b as coolant fluid 123b, to thus be directed back to the bottom of the coolant channel 160, thereby establishing a circulation of coolant fluid between the coolant reservoir 120 and the coolant channel 160.

In some example embodiments, the heat removed from the containment environment 192 by the heated/return coolant fluid 125/126 may be retained in the coolant reservoir 120 for at least a period of time. At S412, in some example embodiments, the removed heat may be further removed from the coolant reservoir 120 via one or more various heat exchangers 128, thereby reducing or preventing the risk of heat removal degradation or overheating of the passive containment cooling system 200.

Referring to operation 411, concurrently with or separately from any of S402 to S412 of operation 401, at S420 and S422, in response to the pressure at an inlet 182i of any check valves 182 of a first check valve assembly 180 reaching a corresponding threshold pressure PX at which the respective check valve 182 is configured to actuate to an open state (e.g., S420=YES), the check valve(s) 182 may open. For a check valve 182 having an inlet 182i that is open to an inlet 180i of the first check valve assembly 180, the pressure at the inlet 182i of said check valve 182 is the pressure P192-1 in the containment environment 192 at the inlet 180i, and thus the check valve 182 may actuate to the open state (e.g., "open") in response to the pressure of the containment environment at the inlet 180i of the first check valve assembly 180 reaching the threshold pressure PX1 of the check valve 182. When all check valves 182 between an inlet 180i and an outlet 180o of a first check valve assembly 180 are open, a flow conduit 187 is opened and a one-way flow 198 from the containment environment 192 to the coolant channel 160 is selectively enabled, and thus, at S424, a containment fluid 197 may flow from the containment environment 192 to the coolant channel 160 via the one or more opened check valves 182 of the first check valve assembly 180.

If, at S426, the pressure at the inlet 180i (e.g., pressure P192-1) does not drop below the first threshold magnitude PX1 (e.g., S426=NO), the flow conduit 187 remains open and the one-way flow 198 through the first check valve assembly 180 is maintained. If, at S426 and S428, the pressure P192-1 drops below the threshold pressure (e.g., S426=YES), the one or more check valves 182 of the first check valve assembly 180 may actuate to the closed state and thus the flow conduit 187 is closed and the one-way flow 198 is inhibited. The one-way flow 198 may be subsequently re-enabled if, at S420 and S422, the pressure P192-1 subsequently rises back to at least the threshold pressure PX1.

It will be understood that the above operations S420-S428 of operation 411 may be performed in parallel with any of the operations S400 to S412 of operation 401. The above operations S420-S428 of operation 411 are described above with reference to the first check valve assembly 180, but it will be understood that, where the passive containment cooling system 200 includes one or more second check valve assemblies 380 in addition to the first check valve assembly 180, operations S420-S428 may be performed in parallel with regard to the one or more second check valve assemblies 380, in parallel with operations S420-S428 being performed with regard to the first check valve assembly 180.

Concurrently with or separately from any of S402 to S412 and/or S420 to S428 (e.g., operation 401 and/or operation 411), at S430 and S432, one or more fusible plugs 190 at a bottom vertical depth DT190 in the coolant channel 160 may at least partially melt (e.g., based on the fusible alloy 193 extending through a conduit 195 defined by a cylindrical body 191 between an end 190*i* that is open to the containment environment 192 and an opposite end 190*o* that is open to the coolant channel 160), based on a temperature T192 at the containment environment-facing end 190*i* of the fusible plug 190 reaching a threshold temperature TX (e.g., S430=YES), where the threshold temperature TX may be a melting temperature of the fusible alloy 193 at the pressure P192-2 of the containment environment 192 at the end 190*i*. As a result of said at least partial melting at S432, at least some of the coolant fluid 124 in the coolant channel 160 at depth DT190 may, at S434 and as shown by line 422, flow through the conduit 195 exposed as a result of the melting at S432 into the containment environment 192 thereby at least partially flooding the containment environment 192.

At S436, the coolant fluid 124 flooding the containment environment 192 may, if the containment environment 192 is filled with coolant fluid up to depth DT180, rise to depth DT180 based on absorbing heat from the containment environment 192, and the coolant fluid may, as shown by line 431, flow through the open flow conduit 187 through check valve assembly 180 at depth DT180, as part of the one-way flow 198, back into the coolant channel 160 at depth DT180 to be returned to the coolant reservoir 120 in S406 to S410. In some example embodiments, S420=YES and S426=NO whenever operation S430=YES, such that the flow conduit 187 may be open whenever the fusible plug 190 at least partially melts at S432.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some example embodiments of the disclosed processes may be implemented using fewer elements than that of the illustrated and described processes, and some example embodiments of the disclosed processes may be implemented using more elements than that of the illustrated and described processes.

The invention claimed is:

1. A nuclear plant, comprising:
a nuclear reactor;
a containment structure having one or more inner surfaces at least partially defining a containment environment in which the nuclear reactor is located;
a passive containment cooling system, including
a coolant reservoir configured to hold a coolant fluid,
a coolant channel coupled to the containment structure such that the coolant channel extends vertically from a coolant channel inlet at a bottom of the coolant channel to a coolant channel outlet at a top of the coolant channel,
a coolant supply conduit extending downwards from an inlet of the coolant supply conduit that is open to a lower region of the coolant reservoir, an outlet of the coolant supply conduit is coupled to the coolant channel inlet, such that the coolant supply conduit is configured to direct a flow of the coolant fluid downwards out of the lower region of the coolant reservoir and into the bottom of the coolant channel via the coolant channel inlet according to gravity, such that the coolant fluid rises through the coolant channel from the bottom of the coolant channel to the top of the coolant channel according to a change in buoyancy of the coolant fluid based on the coolant fluid absorbing heat rejected from the nuclear reactor in the containment environment via at least the containment structure, and
a coolant return conduit having an inlet coupled to the coolant channel outlet at the top of the coolant channel, the coolant return conduit extending upwards from the inlet of the coolant return conduit to an outlet of the coolant return conduit that is open to an upper region of the coolant reservoir that is above the lower region of the coolant reservoir, such that the coolant return conduit is configured to direct a flow of the coolant fluid to rise out of the top of the coolant channel via the coolant channel outlet and into the upper region of the coolant reservoir according to increased buoyancy of the coolant fluid at the top of the coolant channel over buoyancy of the coolant fluid at the bottom of the coolant channel; and
a first check valve assembly at a first vertical depth below a top surface of the coolant fluid in the coolant reservoir, the first check valve assembly in fluid communication with the coolant reservoir through the coolant channel and in fluid communication with the containment environment, wherein
the first check valve assembly includes one or more check valves coupled between a first check valve assembly inlet and a first check valve assembly outlet, the first check valve assembly inlet being open to the containment environment, the first check valve assembly outlet being in fluid communication with the coolant reservoir through the coolant channel,
the one or more check valves are configured to open in response to a pressure at an inlet of the one or more check valves being equal to or greater than a first threshold magnitude, the first threshold magnitude at least partially corresponding to a hydrostatic pressure of the coolant fluid at the first check valve assembly outlet at the first vertical depth, and the first check valve assembly is configured to selectively enable one-way flow of a containment fluid, from the containment environment via the first check valve assembly inlet to the coolant reservoir through the coolant channel via the first check valve assembly outlet and the coolant channel, based on the one or more check valves opening in response to a pressure of the containment environment at the first check valve assembly inlet at the first vertical depth being equal to or greater than the first threshold magnitude.

2. The nuclear plant of claim 1, wherein the first threshold magnitude is greater than a reference hydrostatic pressure of the coolant fluid at the first vertical depth below the top surface of the coolant fluid in the coolant reservoir that results from the coolant reservoir being filled to a reference reservoir depth.

3. The nuclear plant of claim 1, wherein
the first check valve assembly is configured to, subsequently to selectively enabling the one-way flow, inhibit the one-way flow of the containment fluid based on the one or more check valves closing in response to the pressure of the containment environment at the first check valve assembly inlet being less than the first threshold magnitude.

4. The nuclear plant of claim 1, wherein
the one or more check valves include a series connection of a plurality of check valves between the first check valve assembly inlet and the first check valve assembly outlet,
each check valve of the plurality of check valves is configured to open in response to a pressure at an inlet of the check valve being equal to or greater than the first threshold magnitude, and
the first check valve assembly is configured to selectively enable the one-way flow based on all check valves of the series connection of the plurality of check valves opening.

5. The nuclear plant of claim 1, wherein
the one or more check valves include a parallel connection of a plurality of sets of one or more check valves between the first check valve assembly inlet and one or more check valve assembly outlets,
each check valve of the plurality of sets of one or more check valves is configured to open in response to a pressure at an inlet of the check valve being equal to or greater than the first threshold magnitude, and
the first check valve assembly is configured to selectively enable the one-way flow based on any set of one or more check valves of the parallel connection of the plurality of sets of one or more check valves.

6. The nuclear plant of claim 1, wherein
the first check valve assembly includes a burst disc coupled in series with the inlet of the one or more check valves and the first check valve assembly inlet, the burst disc configured to rupture in response to the pressure of the containment environment at the first check valve assembly inlet being equal to or greater than a particular set point pressure magnitude.

7. The nuclear plant of claim 1, further comprising:
a second check valve assembly at a second vertical depth below the top surface of the coolant fluid in the coolant reservoir, the second check valve assembly in fluid communication with the coolant reservoir through the coolant channel and in fluid communication with the containment environment, the second vertical depth being less than the first vertical depth,
wherein the second check valve assembly is configured to selectively enable one-way flow of the containment fluid, from the containment environment to the coolant reservoir through the coolant channel, based on one or more check valves of the second check valve assembly opening in response to a pressure of the containment environment at an inlet of the second check valve assembly being equal to or greater than a second threshold magnitude, the second threshold magnitude at least partially corresponding to a hydrostatic pressure of the coolant fluid at an outlet of the second check valve assembly at the second vertical depth.

8. The nuclear plant of claim 1, wherein
the first check valve assembly extends through the containment structure and into the coolant channel at the first vertical depth, and the first check valve assembly is open to the coolant channel, and
the first check valve assembly is configured to selectively enable the one-way flow of the containment fluid, from the containment environment via the first check valve assembly inlet, to the coolant channel via the first check valve assembly outlet.

9. The nuclear plant of claim 1, further comprising:
a fusible plug in fluid communication with the coolant reservoir through the coolant channel and in fluid communication with the containment environment at a bottom vertical depth below the top surface of the coolant fluid in the coolant reservoir, the bottom vertical depth being greater than the first vertical depth, such that a hydrostatic pressure of the coolant fluid at the bottom vertical depth is greater than the hydrostatic pressure of the coolant fluid at the first check valve assembly outlet at the first vertical depth,
wherein the fusible plug is configured to at least partially melt in response to a temperature in the containment environment at an end of the fusible plug that is open to the containment environment being equal to or greater than a threshold temperature, such that the fusible plug exposes a flow conduit extending between the coolant reservoir into the containment environment through the coolant channel to at least partially flood the containment environment with at least some of the coolant fluid.

10. The nuclear plant of claim 9, wherein the first check valve assembly is configured to, based on selectively enabling the one-way flow of the containment fluid in response to the pressure in the containment environment at the first check valve assembly inlet being equal to or greater than the first threshold magnitude, maintain a pressure in the containment environment at the bottom vertical depth at a magnitude that is less than the hydrostatic pressure of the coolant fluid at the bottom vertical depth, to enable flow of the coolant fluid through the exposed flow conduit and into the containment environment through the coolant channel in response to the fusible plug at least partially melting.

11. The nuclear plant of claim 5, wherein
each separate set of one or more check valves between the first check valve assembly inlet and the one or more check valve assembly outlets includes a series connection of check valves between the first check valve assembly inlet and the first check valve assembly outlet,
each check valve of each series connection of check valves is configured to open in response to a pressure at an inlet of the check valve being equal to or greater than the first threshold magnitude, and the first check valve assembly is configured to selectively enable the one-way flow based on all check valves of at least one series connection of check valves opening.

\* \* \* \* \*